(12) United States Patent
Bradford

(10) Patent No.: US 10,687,665 B1
(45) Date of Patent: Jun. 23, 2020

(54) STUFFED WAFFLE MAKER

(71) Applicant: Michael LaVelle Bradford, Pflugerville, TX (US)

(72) Inventor: Michael LaVelle Bradford, Pflugerville, TX (US)

( * ) Notice: Subject to any disclaimer, the term of this patent is extended or adjusted under 35 U.S.C. 154(b) by 45 days.

(21) Appl. No.: 15/945,327

(22) Filed: Apr. 4, 2018

Related U.S. Application Data

(63) Continuation-in-part of application No. 15/377,982, filed on Dec. 13, 2016, now Pat. No. 10,485,239.

(60) Provisional application No. 62/269,130, filed on Dec. 16, 2015.

(51) Int. Cl.
| | | |
|---|---|---|
| *A22C 7/00* | (2006.01) | |
| *A47J 37/06* | (2006.01) | |
| *A21D 13/31* | (2017.01) | |

(52) U.S. Cl.
CPC ........... *A47J 37/0611* (2013.01); *A21D 13/31* (2017.01); *A47J 2037/0617* (2013.01)

(58) Field of Classification Search
CPC .................. A21D 13/31; A47J 37/0611; A47J 2037/0617; A47J 37/0814; A47J 37/0821; A47J 27/18
USPC ..... 99/327, 328, 329 R, 329 P, 329 RT, 330, 99/331, 332, 337, 372, 373, 374, 375, 99/376, 377, 378, 379, 380, 381, 382, 99/383, 384
See application file for complete search history.

(56) References Cited

U.S. PATENT DOCUMENTS

| | | | | |
|---|---|---|---|---|
| 194,894 | A * | 9/1877 | Daly ................... | A47J 37/0611 99/377 |
| 229,280 | A * | 6/1880 | Selden et al. ........ | A47J 37/0611 99/377 |
| 246,194 | A * | 8/1881 | Patton .................. | A47J 37/0611 99/377 |
| 270,659 | A * | 1/1883 | Griswold et al. .... | A47J 37/0611 99/374 |
| 1,117,929 | A * | 11/1914 | Turnbull et al. ....... | A21B 5/023 99/373 |
| 1,336,734 | A * | 4/1920 | De Graff .............. | A47J 37/0611 99/375 |
| 1,385,829 | A * | 7/1921 | Holbrook ............. | A47J 37/0611 99/378 |
| 1,401,688 | A * | 12/1921 | Forshee ............... | A47J 37/0611 99/378 |
| 1,428,476 | A * | 9/1922 | Crossan ............... | A47J 37/0611 99/377 |

(Continued)

*Primary Examiner* — Jimmy Chou
(74) *Attorney, Agent, or Firm* — Rick B. Yeager

(57) ABSTRACT

A waffle iron comprises textured upper, lower, and perimeter heatable plates that can be assembled to create a cavity into which batter and other prepared ingredients are dispensed to cook a waffle having sufficient depth to feature a waffle pattern along its top and bottom faces as well as along its thickness and to fully contain within its batter separate, prepared ingredients which are enclosed within the waffle to make a single unit and can be eaten in its entirety by hand without having to fold the waffle around those ingredients, sandwich those ingredients between waffles, or use any other means to keep the waffle from separating from the ingredients. The waffle can be visually inspected for doneness during the cooking process or removed from the assembled unit once cooked by separating the individual plates. Electronic means may also be employed to monitor or alert of doneness.

8 Claims, 30 Drawing Sheets

(56) References Cited

U.S. PATENT DOCUMENTS

| | | | | | |
|---|---|---|---|---|---|
| 1,438,602 | A | * | 12/1922 | Kruesheld | A47J 37/0611 99/378 |
| 1,446,532 | A | * | 2/1923 | Wolcott | A47J 37/0611 99/340 |
| 1,450,277 | A | * | 4/1923 | Brown | A47J 37/0611 99/340 |
| 1,466,198 | A | * | 8/1923 | Sickinger | A47J 37/0611 99/378 |
| 1,470,899 | A | * | 10/1923 | Wells | A47J 37/0611 99/378 |
| 1,493,444 | A | * | 5/1924 | Burch | A47J 37/0611 99/375 |
| 1,516,265 | A | * | 11/1924 | Curtiss | A47J 37/0611 99/375 |
| 1,524,546 | A | * | 1/1925 | Forshee | A47J 37/0611 99/375 |
| 1,528,050 | A | * | 3/1925 | Forshee | A47J 37/0611 99/337 |
| 1,534,430 | A | * | 4/1925 | Wells | A47J 37/0611 99/378 |
| 1,534,431 | A | * | 4/1925 | Wells | A47J 37/0611 99/378 |
| 1,539,276 | A | * | 5/1925 | Savage | A47J 37/0611 99/378 |
| 1,545,675 | A | * | 7/1925 | Madsen | A47J 37/0611 99/377 |
| 1,546,347 | A | * | 7/1925 | Simmons | A47J 37/0611 99/373 |
| 1,553,741 | A | * | 9/1925 | Bingham | A47J 37/0611 99/377 |
| 1,553,989 | A | * | 9/1925 | Cook | A47J 37/0611 99/375 |
| 1,556,767 | A | * | 10/1925 | Dodge, Jr. | A47J 37/0611 99/339 |
| 1,557,010 | A | * | 10/1925 | Biebel | A47J 37/0611 99/372 |
| 1,559,012 | A | * | 10/1925 | Smith | A47J 37/0611 99/372 |
| 1,574,141 | A | * | 2/1926 | Weir | A47J 37/0611 99/376 |
| 1,586,093 | A | * | 5/1926 | Leitner | A47J 37/0611 99/380 |
| 1,586,402 | A | * | 5/1926 | Boyce | A47J 37/0611 99/357 |
| 1,609,317 | A | * | 12/1926 | Smith | A47J 37/0611 99/339 |
| 1,615,122 | A | * | 1/1927 | Gordon | A47J 37/0611 99/383 |
| 1,617,026 | A | * | 2/1927 | Neylon | A47J 37/0611 99/379 |
| 1,632,630 | A | * | 6/1927 | Simmons | A47J 37/0611 16/266 |
| 1,633,954 | A | * | 6/1927 | Procter | A47J 37/0611 99/331 |
| 1,641,455 | A | * | 9/1927 | Quatman | A47J 37/0611 99/373 |
| 1,646,726 | A | * | 10/1927 | Ehrgott | A47J 37/0611 99/375 |
| 1,648,335 | A | * | 11/1927 | Cole | A47J 37/0611 99/374 |
| 1,649,039 | A | * | 11/1927 | Oscar | A47J 37/0611 99/381 |
| 1,655,665 | A | * | 1/1928 | Shroyer | A47J 37/0611 99/378 |
| 1,661,294 | A | * | 3/1928 | Lemaster | A47J 37/0611 99/376 |
| 1,694,981 | A | * | 12/1928 | Randolph | A47J 37/0611 99/378 |
| 1,708,499 | A | * | 4/1929 | Filbey | A47J 37/0611 99/377 |
| 1,729,662 | A | * | 10/1929 | Guest | A47J 37/0611 99/339 |
| 1,754,486 | A | * | 4/1930 | Schott | A47J 37/0611 99/372 |
| 1,754,800 | A | * | 4/1930 | Preston | A47J 37/0611 99/374 |
| 1,757,334 | A | * | 5/1930 | Rankin | A47J 37/0611 99/383 |
| 1,764,908 | A | * | 6/1930 | Strauss | A47J 37/0611 99/343 |
| 1,769,045 | A | * | 7/1930 | Strite | A47J 37/0611 99/378 |
| 1,798,648 | A | * | 3/1931 | Armstrong | A47J 37/0611 99/343 |
| 1,801,260 | A | * | 4/1931 | Bersted | A47J 37/0611 99/378 |
| 1,806,196 | A | * | 5/1931 | Fromknecht | A47J 37/0611 99/375 |
| 1,873,104 | A | * | 8/1932 | Benson | A47J 37/0611 99/374 |
| 1,879,010 | A | * | 9/1932 | Antrim | A47J 37/0611 99/377 |
| D87,896 | S | * | 10/1932 | Wagner | D7/352 |
| 1,918,051 | A | * | 7/1933 | McArdle | A47J 37/0611 99/357 |
| 1,947,124 | A | * | 2/1934 | Clauss | A47J 37/0611 99/380 |
| 1,954,235 | A | * | 4/1934 | Becker | A47J 37/0611 99/339 |
| 1,978,872 | A | * | 10/1934 | Wharton | A47J 37/0611 99/327 |
| 2,023,791 | A | * | 12/1935 | Samuels | A47J 37/0611 99/373 |
| 2,029,620 | A | * | 2/1936 | Johnson | A47J 37/0611 99/341 |
| D100,195 | S | * | 6/1936 | Bellamy | D7/353 |
| 2,070,706 | A | * | 2/1937 | Benson | A47J 37/0611 99/374 |
| 2,081,164 | A | * | 5/1937 | Bersted | A47J 37/0611 99/380 |
| 2,099,152 | A | * | 11/1937 | Walder | A47J 37/0611 99/331 |
| 2,116,688 | A | * | 5/1938 | Ratliff | A47J 37/0611 99/374 |
| 2,136,764 | A | * | 11/1938 | Smith | A47J 37/0611 99/378 |
| 2,159,068 | A | * | 5/1939 | Young | A47J 37/0611 99/331 |
| 2,170,153 | A | * | 8/1939 | Misiak | A47J 37/0611 99/381 |
| 2,207,264 | A | * | 7/1940 | Neuberger | A47J 37/0857 99/373 |
| 2,211,900 | A | * | 8/1940 | Leavitt | A47J 37/0611 99/372 |
| 2,230,728 | A | * | 2/1941 | Propernick | A47J 37/0611 99/343 |
| 2,237,147 | A | * | 4/1941 | Ireland | A47J 37/0611 99/331 |
| 2,262,279 | A | * | 11/1941 | Ireland | A47J 37/0611 99/331 |
| 2,267,387 | A | * | 12/1941 | Winborne | H01H 37/28 337/375 |
| 2,269,844 | A | * | 1/1942 | Wood | A47J 37/0611 99/374 |
| 2,300,061 | A | * | 10/1942 | Purpura | A47J 37/0611 99/329 R |
| 2,300,323 | A | * | 10/1942 | Tams | A47J 37/0611 99/376 |
| 2,300,644 | A | * | 11/1942 | Boyd | A47J 37/0611 99/374 |
| 2,308,091 | A | * | 1/1943 | McCullough | A47J 37/0611 99/331 |
| 2,314,872 | A | * | 3/1943 | Dickey | A47J 37/0611 99/340 |
| 2,352,706 | A | * | 7/1944 | Gruenke | A47J 37/0611 99/381 |
| 2,354,240 | A | * | 7/1944 | Young | A47J 37/0611 99/375 |

(56) References Cited

U.S. PATENT DOCUMENTS

| | | | | |
|---|---|---|---|---|
| 2,358,452 A * | 9/1944 | Garstang | A47J 37/0611 | 99/376 |
| 2,469,595 A * | 5/1949 | Foster | A47J 37/0611 | 99/374 |
| 2,476,213 A * | 7/1949 | O'Connor | A47J 37/0611 | 99/376 |
| 2,496,705 A * | 2/1950 | Farr | A47J 37/0611 | 99/376 |
| 2,556,892 A * | 6/1951 | Young | A47J 37/0611 | 99/383 |
| D164,258 S * | 8/1951 | Oertli | D7/352 | |
| 2,566,915 A * | 9/1951 | Young | A47J 37/0611 | 99/379 |
| 2,571,216 A * | 10/1951 | Davis | A47J 37/0611 | 99/340 |
| 2,571,891 A * | 10/1951 | Kassan | A47J 37/0611 | 99/373 |
| 2,575,848 A * | 11/1951 | Stemp | A47G 21/10 | 99/540 |
| 2,597,541 A * | 5/1952 | Squires | A47J 37/0611 | 99/377 |
| 2,610,572 A * | 9/1952 | Farr | A47J 37/0611 | 99/331 |
| 2,635,169 A * | 4/1953 | Miller | A47J 37/0611 | 219/536 |
| 2,655,687 A * | 10/1953 | Miller | A47J 37/0611 | 16/371 |
| 2,663,785 A * | 12/1953 | Graham | A47J 37/0611 | 219/495 |
| 2,734,983 A * | 2/1956 | Krichton | A47J 37/0611 | 219/448.17 |
| 2,743,665 A * | 5/1956 | Gustafson | A47J 37/0611 | 99/331 |
| 2,748,690 A * | 6/1956 | Lipsich | A47J 37/0611 | 99/340 |
| 2,765,727 A * | 10/1956 | Lipsich | A47J 37/0611 | 99/331 |
| 2,784,663 A * | 3/1957 | Rand | A47J 37/0611 | 99/376 |
| 2,873,879 A * | 2/1959 | Moore | A47J 37/0611 | 220/324 |
| 2,877,703 A * | 3/1959 | Pavelka, Jr. | A47J 37/0611 | 99/331 |
| 2,881,299 A * | 4/1959 | Jepson | A47J 37/0611 | 99/340 |
| 2,895,407 A * | 7/1959 | Gomersall | A47J 37/0611 | 99/379 |
| 2,899,888 A * | 8/1959 | Koci | A47J 37/0611 | 99/331 |
| 2,903,959 A * | 9/1959 | Wagner | A47J 37/0611 | 99/376 |
| 2,922,357 A * | 1/1960 | D Arcey | A47J 37/0611 | 99/379 |
| 2,936,697 A * | 5/1960 | Kueser | A47J 37/0611 | 99/331 |
| 3,256,804 A * | 6/1966 | Petrin | A47J 37/0611 | 99/380 |
| 3,281,577 A * | 10/1966 | Altemiller | A47J 37/06 | 219/524 |
| 3,301,999 A * | 1/1967 | Chisholm | H05B 1/0263 | 219/393 |
| 3,377,942 A * | 4/1968 | Carbon | A47J 37/0611 | 99/376 |
| 3,418,919 A * | 12/1968 | Nardon | A47J 37/0611 | 99/378 |
| 3,696,734 A * | 10/1972 | Beasley | A47J 37/0611 | 99/331 |
| 3,799,047 A * | 3/1974 | Freeman | A47J 37/0611 | 99/332 |
| D237,935 S * | 12/1975 | Nygren | D7/410 | |
| 3,999,473 A * | 12/1976 | Carbon | A47J 37/0611 | 99/377 |
| 4,075,940 A * | 2/1978 | Carbon | A47J 37/0611 | 99/377 |
| D247,763 S * | 4/1978 | Carbon | D7/352 | |
| D253,217 S * | 10/1979 | Marsoobian | 219/524 | |
| 4,206,345 A * | 6/1980 | Maass | A47J 37/0611 | 219/386 |
| 4,386,557 A * | 6/1983 | Meraj | A47J 37/0611 | 219/450.1 |
| 4,457,218 A * | 7/1984 | Gruber | A21B 5/023 | 425/233 |
| 4,476,379 A * | 10/1984 | Andrizzi | A47J 37/0611 | 219/386 |
| 4,664,025 A * | 5/1987 | Martinez | A47J 37/0611 | 100/292 |
| 4,803,918 A * | 2/1989 | Carbon | A47J 37/0611 | 219/524 |
| D308,152 S * | 5/1990 | Tzouflas | D7/352 | |
| 4,967,650 A * | 11/1990 | Weigle | A47J 37/0611 | 99/374 |
| 5,097,758 A * | 3/1992 | Fresh | A47J 17/16 | 241/169 |
| 5,253,565 A * | 10/1993 | Burton | A47J 37/0611 | 219/524 |
| 5,299,492 A * | 4/1994 | Carbon | A21B 5/023 | 219/524 |
| 5,335,591 A * | 8/1994 | Pozar | A47G 21/106 | 100/116 |
| 5,341,727 A * | 8/1994 | Dickson | A47J 37/0611 | 100/319 |
| 5,481,963 A * | 1/1996 | Sesona | A21B 5/03 | 99/335 |
| 5,636,564 A * | 6/1997 | Weiss | A47J 37/0611 | 219/441 |
| 5,639,498 A * | 6/1997 | Bakosch | A47J 43/20 | 426/391 |
| 5,642,659 A * | 7/1997 | Sesona | A47J 37/0611 | 99/376 |
| 5,768,994 A * | 6/1998 | Bobo | A21B 5/023 | 426/523 |
| 5,937,742 A * | 8/1999 | Steeb | A47J 37/0611 | 99/375 |
| 5,983,784 A * | 11/1999 | Goldberg | A47J 37/0611 | 99/372 |
| 6,044,755 A * | 4/2000 | Misceo | A21B 5/023 | 219/521 |
| 6,167,796 B1 * | 1/2001 | Wright | A47J 37/0611 | 99/332 |
| 6,412,400 B1 * | 7/2002 | Gambino | A47J 37/0611 | 99/372 |
| 6,427,581 B1 * | 8/2002 | Wu | A47J 37/0611 | 99/331 |
| D465,965 S * | 11/2002 | Dalton | D7/352 | |
| 6,539,844 B1 * | 4/2003 | Bart | A47J 37/10 | 99/376 |
| 6,555,795 B2 * | 4/2003 | Glucksman | A47J 37/0611 | 219/450.1 |
| 6,584,889 B2 * | 7/2003 | Friel, Sr. | A47J 37/0814 | 219/386 |
| D488,667 S * | 4/2004 | Seum | D7/352 | |
| 6,860,191 B2 * | 3/2005 | Jackson | A47J 37/0611 | 99/340 |
| D504,276 S * | 4/2005 | Vial | D7/352 | |
| 7,011,015 B1 * | 3/2006 | Marghella | A47J 43/20 | 294/7 |
| 7,021,199 B2 * | 4/2006 | Lubowicki | A47J 37/0611 | 16/260 |
| D522,803 S * | 6/2006 | Lam | D7/352 | |
| D523,284 S * | 6/2006 | Lam | D7/352 | |
| 7,064,298 B2 * | 6/2006 | Li | A47J 37/0611 | 219/450.1 |
| 7,105,780 B2 * | 9/2006 | De'Longhi | A47J 27/004 | 219/436 |
| 7,180,034 B1 * | 2/2007 | Oppenheimer | A47J 37/0611 | 219/386 |
| D587,061 S * | 2/2009 | Lavy | D7/352 | |

(56) References Cited

U.S. PATENT DOCUMENTS

| | | | | |
|---|---|---|---|---|
| 7,514,655 B2 * | 4/2009 | Fernandez | A47J 37/0611 | 219/386 |
| 7,752,958 B2 * | 7/2010 | Cohen | A47J 37/0611 | 99/349 |
| D657,990 S * | 4/2012 | Kim | D7/352 | |
| 8,151,696 B2 * | 4/2012 | Lubowicki | A47J 37/0611 | 99/375 |
| 8,327,757 B1 * | 12/2012 | Sack | A47J 37/0611 | 206/278 |
| D677,513 S * | 3/2013 | Blacken | D7/352 | |
| D688,513 S * | 8/2013 | Garman | A47J 37/0611 | D7/352 |
| 8,621,986 B2 * | 1/2014 | Serra | A47J 37/0611 | 99/333 |
| 8,915,179 B2 * | 12/2014 | Chang | A47J 37/0611 | 219/386 |
| D730,118 S * | 5/2015 | Fast | D7/352 | |
| D734,089 S * | 7/2015 | Garman | D7/352 | |
| D751,342 S * | 3/2016 | Steeb | D7/352 | |
| D755,002 S * | 5/2016 | Garman | D7/352 | |
| 9,370,275 B2 * | 6/2016 | Jackson | A47J 37/0611 | |
| 9,386,880 B2 * | 7/2016 | Friel, Sr. | G05D 23/1951 | |
| D768,427 S * | 10/2016 | Berge | D7/354 | |
| 10,010,216 B2 * | 7/2018 | Garman | A47J 37/0611 | |
| 10,092,134 B2 * | 10/2018 | Zhan | A47J 37/0611 | |
| D842,640 S * | 3/2019 | Iori | D7/352 | |
| 2002/0153366 A1 * | 10/2002 | Glucksman | A47J 37/0611 | 219/450.1 |
| 2003/0213374 A1 * | 11/2003 | Brady | A47J 37/0611 | 99/378 |
| 2004/0020370 A1 * | 2/2004 | Jackson | A47J 37/0611 | 99/331 |
| 2004/0123744 A1 * | 7/2004 | Bobo | A47J 37/0611 | 99/374 |
| 2005/0005777 A1 * | 1/2005 | Steinberg | A47J 37/0611 | 99/349 |
| 2005/0217492 A1 * | 10/2005 | Albritton | A47J 37/0611 | 99/372 |
| 2006/0049165 A1 * | 3/2006 | Li | A47J 37/0623 | 219/386 |
| 2006/0049169 A1 * | 3/2006 | Li | A47J 37/0611 | 219/450.1 |
| 2006/0201333 A1 * | 9/2006 | Friel, Sr. | A47J 37/0611 | 99/372 |
| 2006/0213373 A1 * | 9/2006 | Fernandez | A47J 37/0611 | 99/349 |
| 2007/0186785 A1 * | 8/2007 | Cohen | A47J 37/0611 | 99/372 |
| 2007/0221653 A1 * | 9/2007 | Krishnan | A47J 37/0611 | 219/450.1 |
| 2008/0105137 A1 * | 5/2008 | Genslak | A47J 37/0611 | 99/350 |
| 2008/0196595 A1 * | 8/2008 | Krishnan | A47J 37/0611 | 99/378 |
| 2008/0257169 A1 * | 10/2008 | Tienor | A47J 37/0611 | 99/377 |
| 2009/0049993 A1 * | 2/2009 | Morgan | A47J 37/0611 | 99/375 |
| 2009/0139412 A1 * | 6/2009 | Zhan | A47J 37/0611 | 99/374 |
| 2010/0024662 A1 * | 2/2010 | Bengtson | A47J 37/0611 | 99/377 |
| 2014/0196611 A1 * | 7/2014 | Reinhart | A21B 5/02 | 99/374 |
| 2015/0144005 A1 * | 5/2015 | Becker | A47J 37/08 | 99/332 |
| 2015/0164274 A1 * | 6/2015 | Jinzhao | A47J 37/015 | 99/372 |
| 2016/0007799 A1 * | 1/2016 | Steeb | A47J 37/0611 | 426/275 |
| 2016/0089804 A1 * | 3/2016 | Osborne | B26D 3/16 | 99/353 |
| 2016/0330796 A1 * | 11/2016 | Zhan | H05B 1/02 | |
| 2017/0042376 A1 * | 2/2017 | Szymanski | A21B 5/02 | |
| 2019/0082884 A1 * | 3/2019 | Posner | A47J 37/0611 | |

* cited by examiner

STUFFED WAFFLE MAKER

RELATED APPLICATIONS

This US non-provisional application is a continuation-in-part of U.S. patent application Ser. No. 15/377,982 filed Dec. 13, 2016 by applicant, which is related to U.S. Provisional Application No. 62/268,130 filed Dec. 16, 2015 by applicant, and claims the priority date of that provisional application.

BACKGROUND OF THE INVENTION

Field of the Invention

The present invention is in the field of cookware, and more particularly to a device used to cook stuffed waffles.

Prior Art

A common culinary item comprises an ingredient or ingredients placed between one or two waffles. Commonly called stuffed waffles or waffle sandwiches, these items must generally be eaten with two hands and a utensil if the interior ingredient has a viscous consistency since the waffle itself does not fully enclose the interior ingredients. At present, there is no device that cooks the batter in such a way that it completely surrounds the interior ingredients.

Existing waffle makers are not capable of cooking a waffle thick enough to be filled with a different ingredient, thus the need for stuffed waffles or waffle sandwiches consisting of an ingredient between two waffles.

SUMMARY OF THE INVENTION

A device can prepare a waffle having a sufficient thickness to completely enclose a separate, interior ingredient and which has a characteristic waffle pattern along its thickness as well as along its top and bottom surfaces.

In one embodiment, a device is provided to cook the waffle over flame or electric burner and comprises separate upper, lower, and side plates having waffle features over one surface and are assembled to create a cavity into which batter and other ingredients are dispensed. Upper and lower plates can be removed during cooking to monitor doneness. Each plate is separated individually to release the waffle from the unit at the completion of the cooking process.

In another embodiment, the upper, lower, and side plates are heated by an electrical source and are connected by mechanical means such as a scissor assembly or gear assembly. The plates are assembled by rotating them along axes to create a cavity into which batter and ingredients are dispensed. Doneness is alerted through an electronic timer. The plates are separated by the same means to remove the cooked waffle.

In another embodiment the upper, lower, and side plates are heated by stovetop, open flame or electric burner. The side plates are connected by mechanical means such as a scissor assembly or hinge assembly. Upon completion of cooking, the upper and lower plates are separated individually and the side plates are separated using a hinge to remove the waffle.

In another embodiment, the side plates may be omitted and the top plate re-positioned directly over the bottom plate to serve as a conventional waffle maker.

DESCRIPTION OF EMBODIMENT

Figure 1:
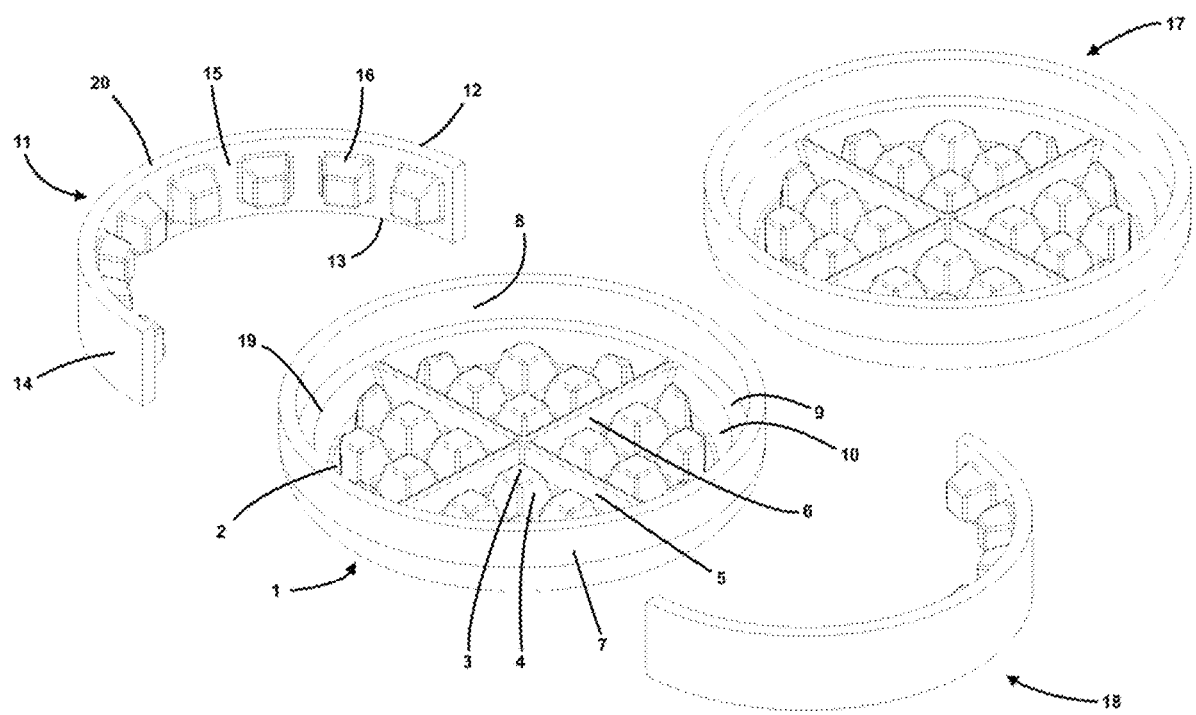
FIG. 1 is an exploded top perspective view of a first embodiment of the device.

In one embodiment, a device is provided to cook the waffle over a flame or electric burner. FIG. 1 is an exploded diagram showing a bottom plate 1 with waffle features along a bottom surface 2 that include a top face 3 and inclined vertical faces 4. The bottom plate includes cross members 5 and 6; an outside cooking surface 7 and side wall 8. The bottom plate has a side plate support lip which comprises a flat top face 9 and an inclined vertical face 10. A first side plate insert 11 has a top edge 12 and a bottom edge 13 that rests on the flat top face of the bottom plate support lip 9. The first side plate insert has an outside surface 14 and an inside surface 15 with a plurality of waffle features 16. The side plate waffle features may match the size and shape of the bottom plate waffle features or may have a different shape or size. In this example the top plate 17 is identical to the bottom plate 1 and both side plates 11, 18 are identical, but the top and bottom surfaces of these could differ or include additional surfaces that would allow for a locking assembly, for example. In this example, the diameter of the side plate support lip 19 and the inner diameter of the side plate 20 are 5"; the diameter of the bottom plate outside surface 7 is 5¾"; the diameter of the side plate outside surface 14 is 5½"; the height of the inclined vertical face of the side plate support lip 10 is ½"; the height of the side wall 8 is 1". Other sizes or shapes may be used.

Figure 2:
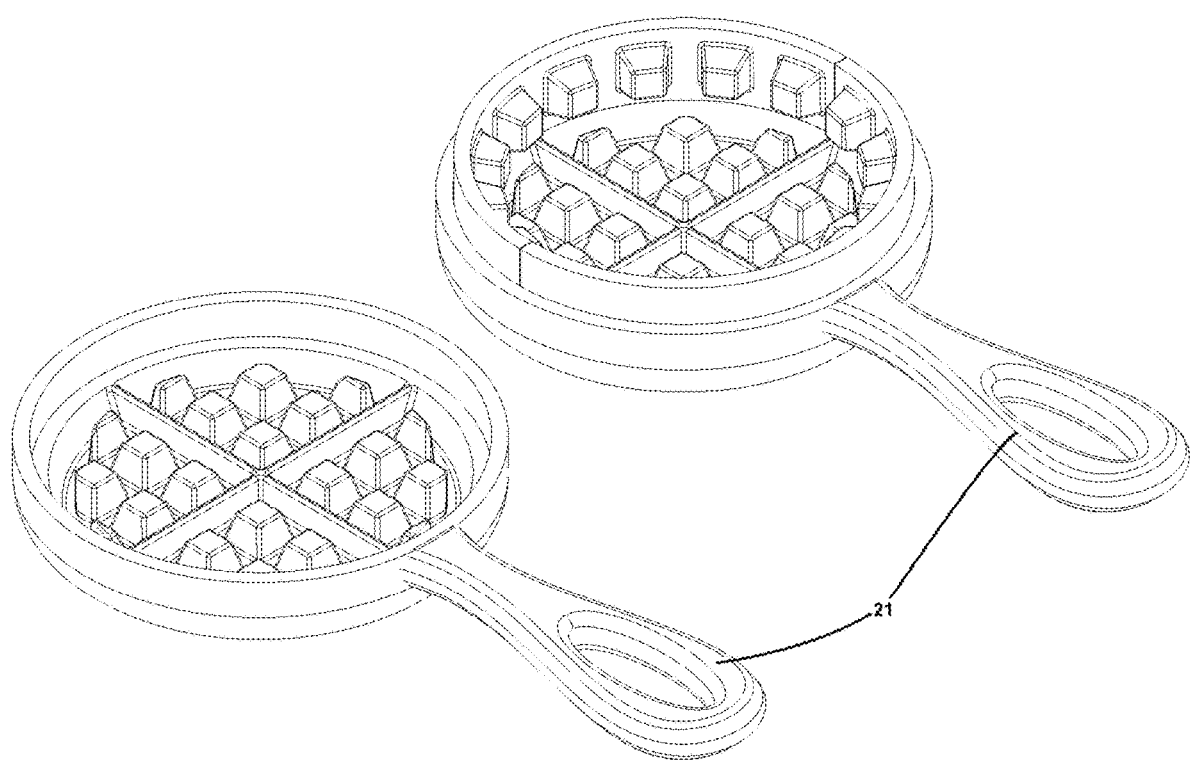
FIG. 2 is a photograph of a manufactured version of the device of FIG. 1 in an opened configuration.

The plates 1, 11, 17, 18 are preferably type III anodized aluminum alloy such as 6061 with a food-safe non-stick coating applied to the surfaces in contact with food. FIG. 2 is an example of this embodiment machined from anodized aluminum with a polytetrafluoroethylene coating on the food contact surfaces. The handle 21 may be of the same material as the bottom plate and can be used to flip the device when cooking. The plates 1, 11, 17, 18 could also be fabricated from a stainless steel alloy, in which case no non-stick coating would typically be applied.

Figure 3:
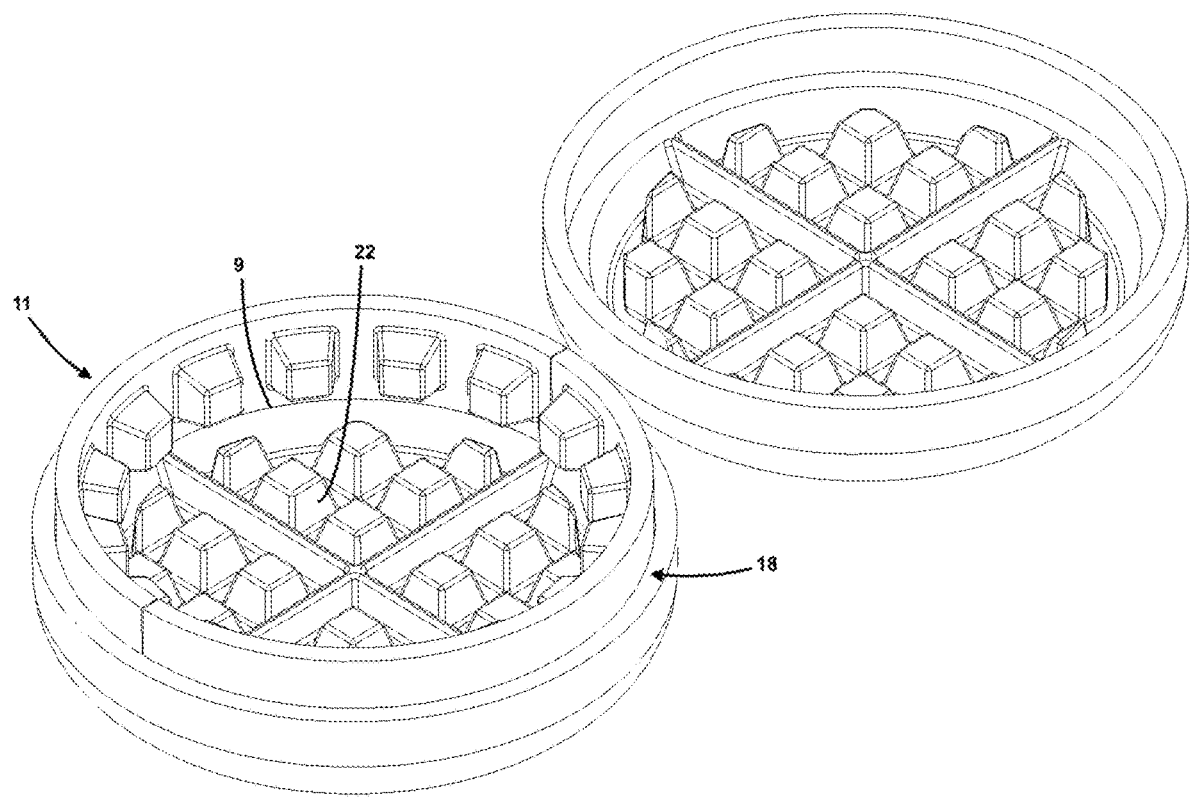
FIG. 3 is a top perspective view of a partially assembled device of FIG. 1 in an opened configuration.
Figure 4:
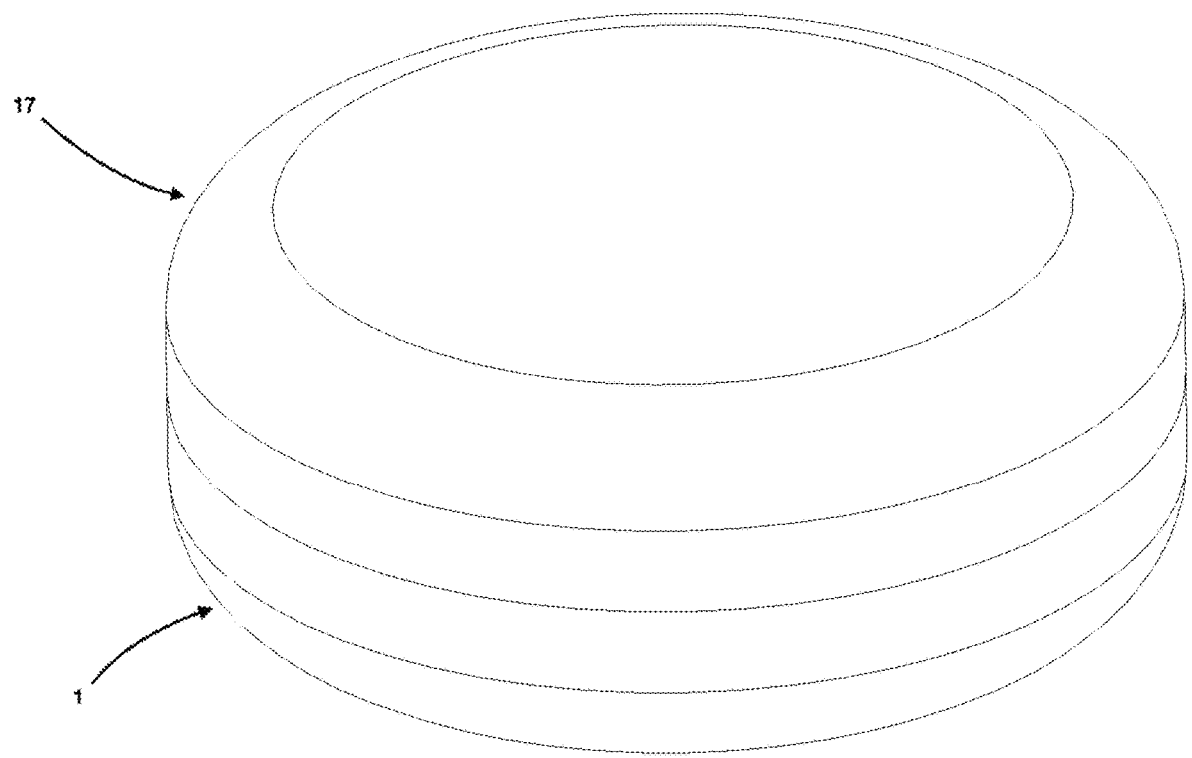
FIG. 4 is a top perspective view, showing the fully-assembled device of FIG. 1.

FIGS. 3-4 depict the device's operation. In FIG. 3, the plates 1, 17 rest flat side down on top of a heating surface. Next, each side plate 11, 18 is placed on the flat top of the bottom plate support lip 9 to create a cavity 22 into which batter and ingredients are dispensed. The heating surface heats the plates 1, 11, 17, 18 to a sufficient temperature to cook the batter. Batter (not shown) is then poured into the bottom plate to where it just covers the waffle features. Next, the filling ingredients (not shown) are placed into the batter. The cavity 22 is filled when the remaining batter is poured over the filling to just below the top of the side plates 17, 18. As shown in FIG. 4, the unit is closed by placing the top plate 17 atop the side plates 17, 18. The entire unit is then flipped to allow for an even distribution of batter inside the cavity 22 such that the bottom plate 1 rests atop the side plates 17, 18 with its flat surface opposite the heating surface. During the cooking process, the entire unit may be flipped to cook the batter sufficiently on both sides. Either plate not resting on the heating surface may be removed during the cooking process to visually inspect doneness. The cooked waffle is removed from the unit by individually separating each plate 1, 11, 17, 18.

DESCRIPTION OF EMBODIMENT

Figure 5:
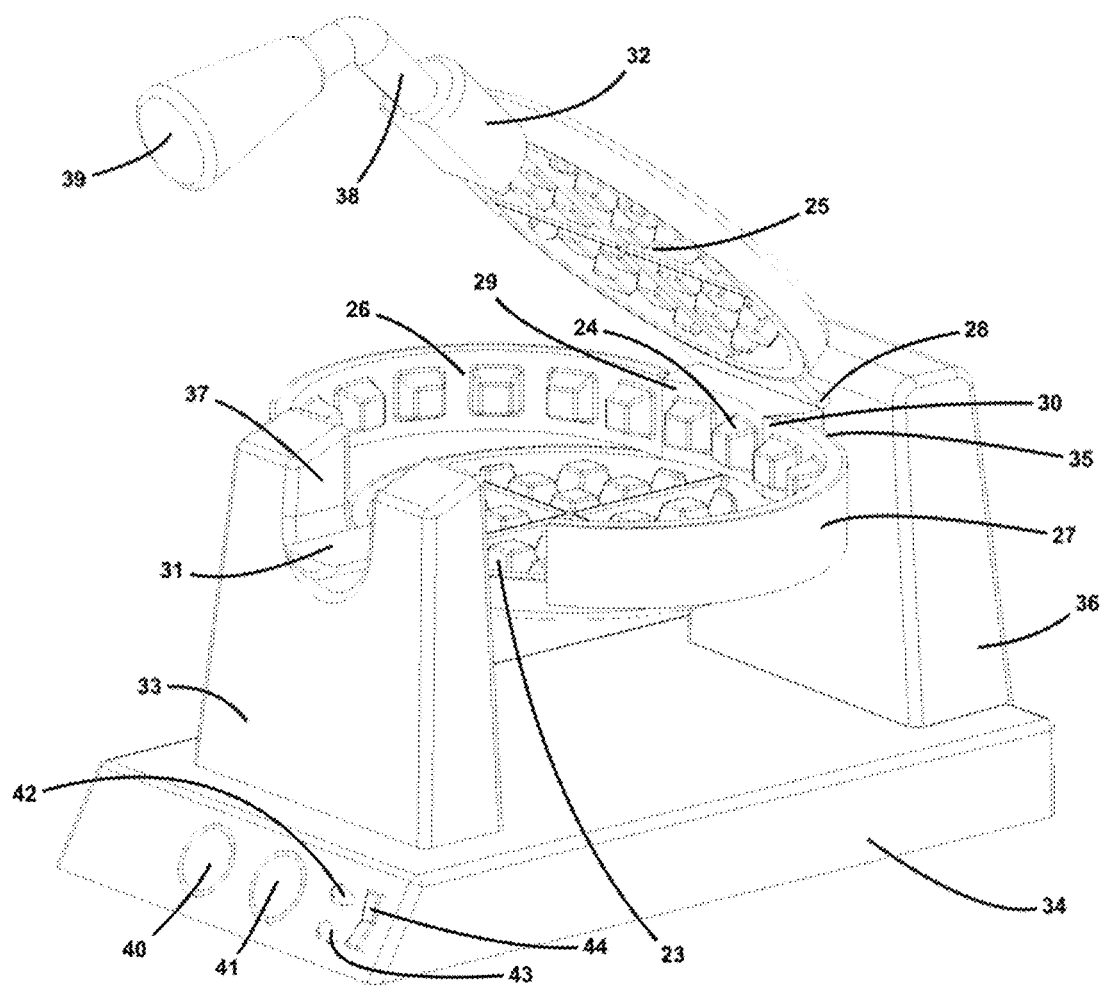
FIG. 5 is a top perspective view of a second embodiment of the device.

FIG. 5 is a front perspective of a second embodiment where the device is heated directly from an electrical source. This electrically-heated waffle maker comprises a bottom plate 23 with waffle features fixed to the bottom of a rear plate 24 with waffle features along its front surface; a top plate 25 with waffle features; and two side plates 26, 27 with waffle features. The top plate 25 is attached to the top face of the rear plate 24 by a horizontally-oriented hinge 28. The side plates 26, 27 are attached to the side surfaces of the rear plate 23 by vertically-oriented hinges 29, 30. The bottom and top plates 23, 25 have cooperating bottom and top retaining structures 31, b, respectively, which are supported by a front support 33 extending upwardly from a bottom base control unit 34 to support the forward ends of the plates 23, 25. The rear plate 24 is attached to a rotating bracket 35 which is mounted to a rear support 36, also extending upwardly from the bottom base control unit 34 to support the rearward ends of plates 23, 25. The front support 33 has a scoop-shaped top 37 into which the bottom retaining structure 31 rests. A handle arm 38 with a plastic end 39 protrudes from the top retaining structure 32. The handle arm 38 bends downward away from the front support 33. The bottom base control unit 34 encloses the electronics (not shown) to regulate heat to the plates 23, 24, 25, 26, 27; indicate power and heating status; and toggle power to the device. The bottom base control unit 34 provides mounting support for a knob 40 to regulate the heat to the bottom and top plates 23, 25; a knob 41 to regulate the heat to the side plates 26, 27; a pilot light 42 indicating whether or not is on, a pilot light 43 indicating whether or not the device is heated and ready for use; and a toggling power switch 44. The temperature knobs 40, 41 can be moved to three preset positions (LOW, MEDIUM, HIGH) allowing the bottom/top portions of the batter to cook at a different rate than the batter along the perimeter.

The plates 23, 24, 25, 26, 27 are preferably cast aluminum which are heated when a voltage is applied thereto such as through internal electrical leads (not shown) and may be enclosed in a shell around the surfaces that do not have waffle features by a non-conductive material. The exposed metal surfaces are treated with a polytetrafluoroethylene coating.

Figure 6:
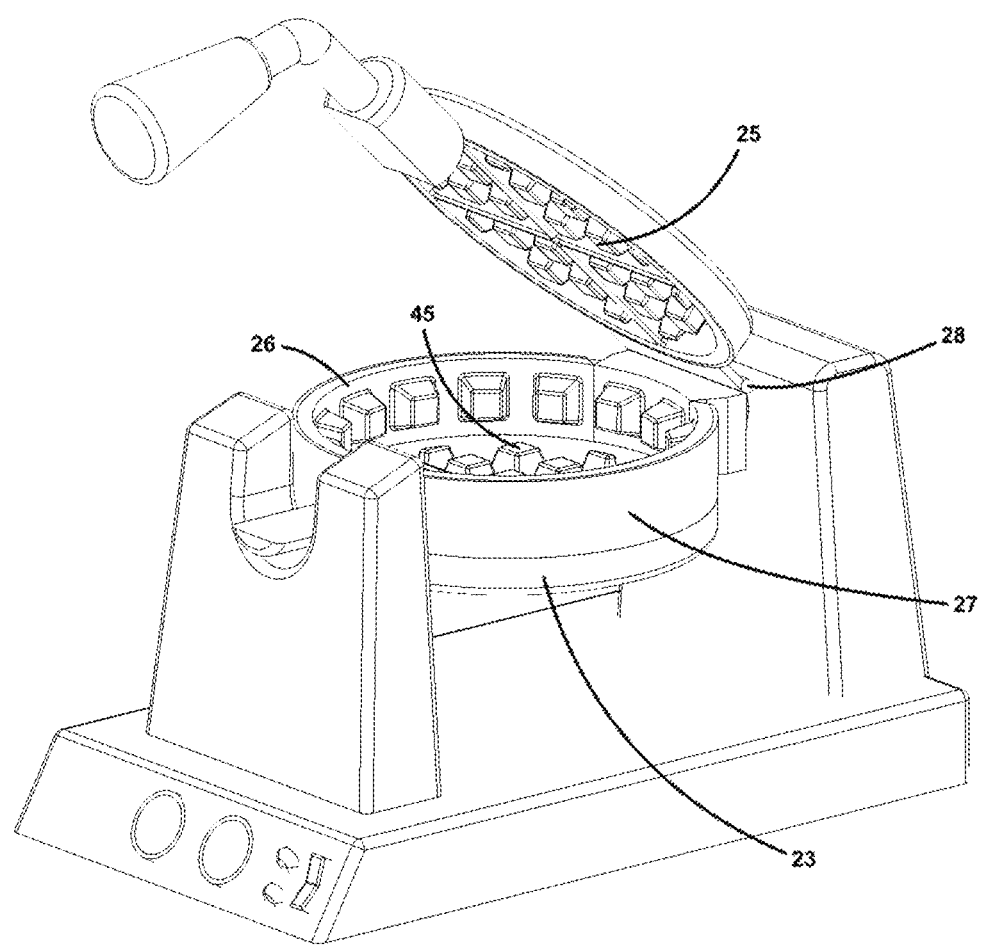
FIG. 6 is a top perspective view of the device of FIG. 5 showing a partially closed unit.
Figure 7:
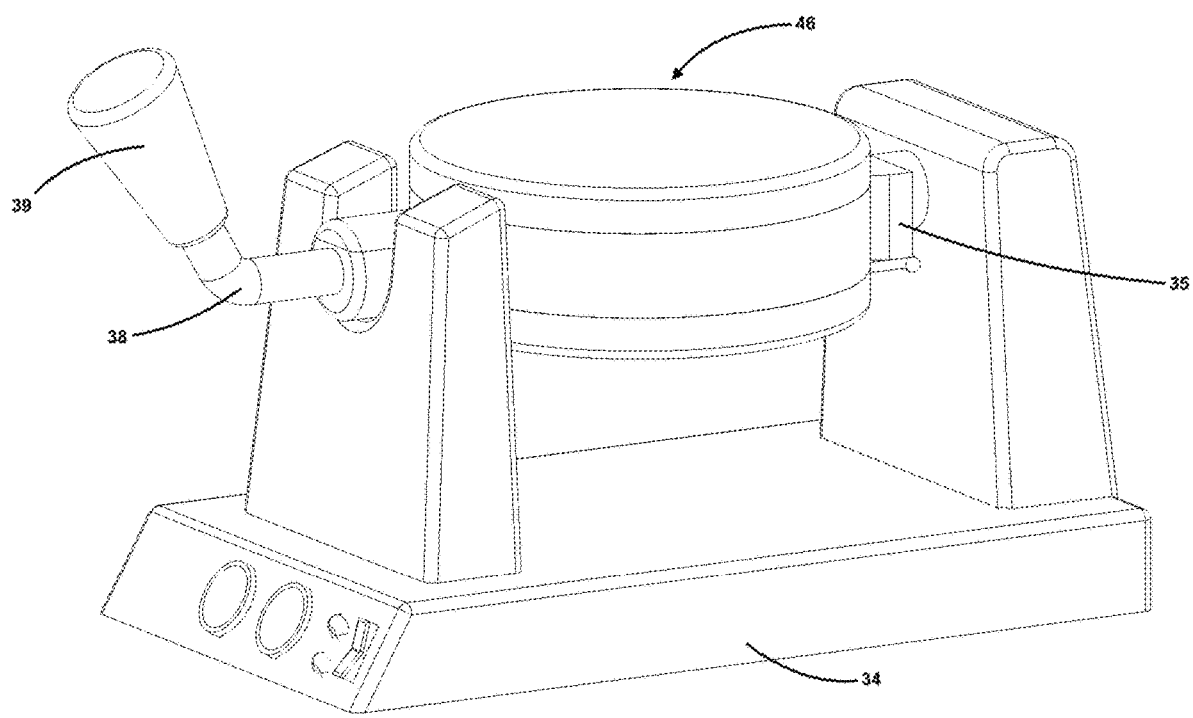
FIG. 7 is a top perspective view of the device of FIG. 5 showing the closed unit flipped during operation.

FIGS. 6, 7 depict the operation of the electrically-heated waffle maker. The side plates 26, 27 rotate to a closed position, making a cavity 45 into which batter (not shown) is poured to just where it covers the top of the waffle features of the bottom plate 23. The filling ingredients (not shown) are then placed onto the batter and then the remaining batter is poured up to top surface of the side plates 26, 27. The top plate 25 rotates down along the horizontal axis aligned with the hinge 28 to a closed position resting on the top surface of the side plates 26, 27. A cooking cycle of the waffle maker is initiated when the closed unit 46 is rotated 180° along the rotating bracket 35 using the handle arm 38 and plastic end 39. An alarm (not shown) housed in the bottom base control unit 34 sounds at the end of the cooking cycle. The alarm is stopped when the closed assembly is rotated back 180° to its original position. The waffle is removed from the device lifting the top plate 25 using the handle arm 38 which automatically rotates side plates 26, 27 along hinges 29, 30.

DESCRIPTION OF EMBODIMENT

Figure 8:
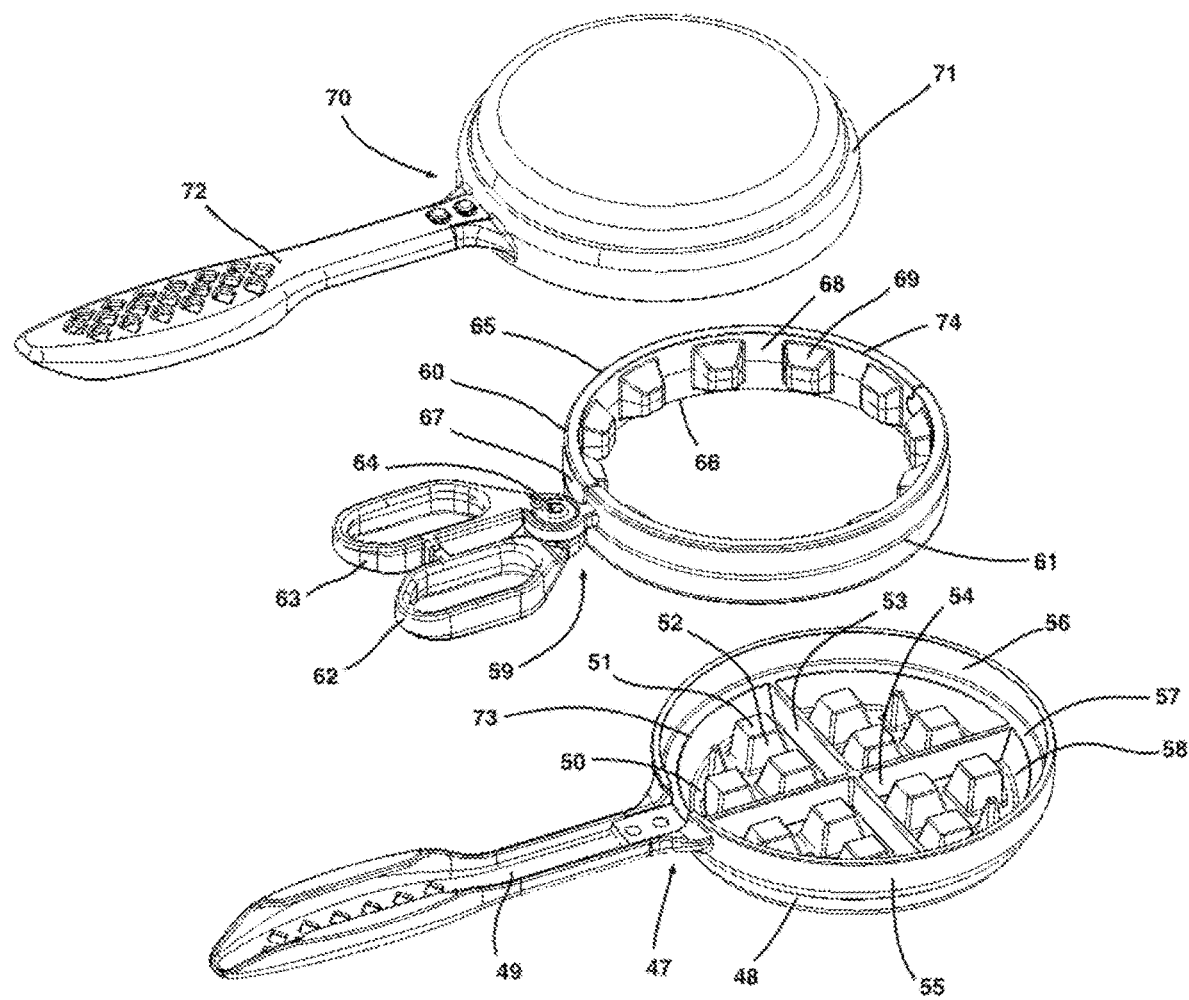
FIG. 8 is an exploded top perspective view of a third embodiment of the device.

In a third embodiment, a device is provided to cook the stuffed waffle over a flame or electric burner. FIG. 8 is an exploded diagram showing a bottom assembly 47 comprised of a bottom plate 48 and a handle 49. The bottom plate has waffle features along a bottom surface 50 that include a top face 51 and inclined vertical faces 52. The bottom plate includes cross members 53 and 54; an outside cooking surface 55 and side wall 56. The bottom plate has a side plate insert support lip which comprises a flat top face 57 and an inclined vertical face 58.

A scissor assembly 59 comprises two side plate inserts 60, 61 which attach to handles 62, 63 respectively and rotate along hinge 64. A first side plate insert 60 has a top edge 65 and a bottom edge 66 that rest on the flat top face of side plate insert support lip 57 of the bottom plate. The first side plate insert has an outside surface 67 and an inside surface 68 with a plurality of waffle features 69. The side plate insert waffle features may match the size and shape of the bottom plate waffle features or may have a different shape or size.

In this example the top assembly 70 is identical to the bottom assembly 47 and both side plate inserts 60, 61 are identical, but the top and bottom surfaces of these could differ or include additional surfaces. In this example, the diameter of the side plate support lip 73 and the inner diameter of the side plate 74 are 5"; the diameter of the bottom plate outside surface 55 is 5¾"; the diameter of the side plate outside surface 67 is 5½"; the height of the inclined vertical face of the side plate support lip 58 is ½"; the height of the side wall 56 is 1". Other sizes or shapes may be used.

The plates 48, 71, 60, 61 are preferably an aluminum alloy such as A380 with a type III anodized finish or a food-safe non-stick coating applied to any of its surfaces. The handles 49, 72 may be of the same or a different material than that of the bottom plate. The plates 48, 71, 60, 61 could also be fabricated from a stainless steel alloy, in which case no non-stick coating would typically be applied.

Figure 9:
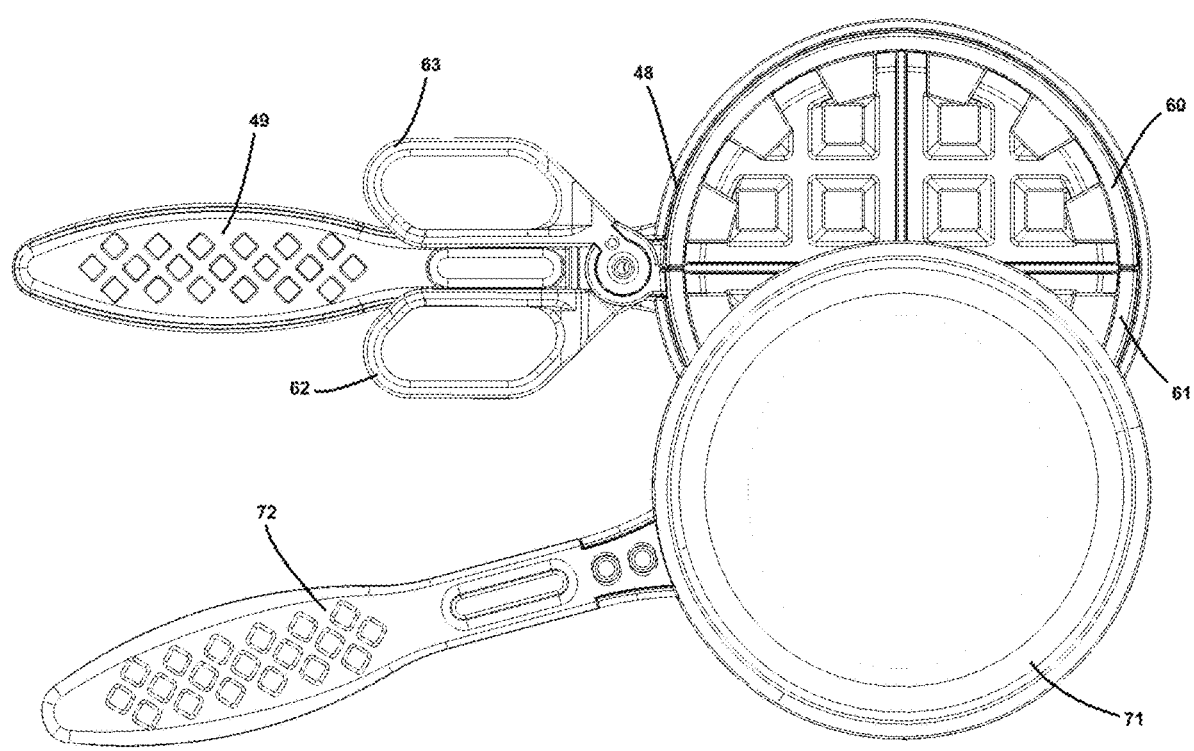
FIG. 9 is a photograph of a manufactured version of the device of FIG. 8 in a partially opened configuration.

FIG. 9 is an example of this embodiment machined from aluminum with a polytetrafluoroethylene coating on the plate surfaces 48, 71, 60, 61 and handles 49, 72, 62, 63 machined from a stainless steel alloy.

Figure 10:
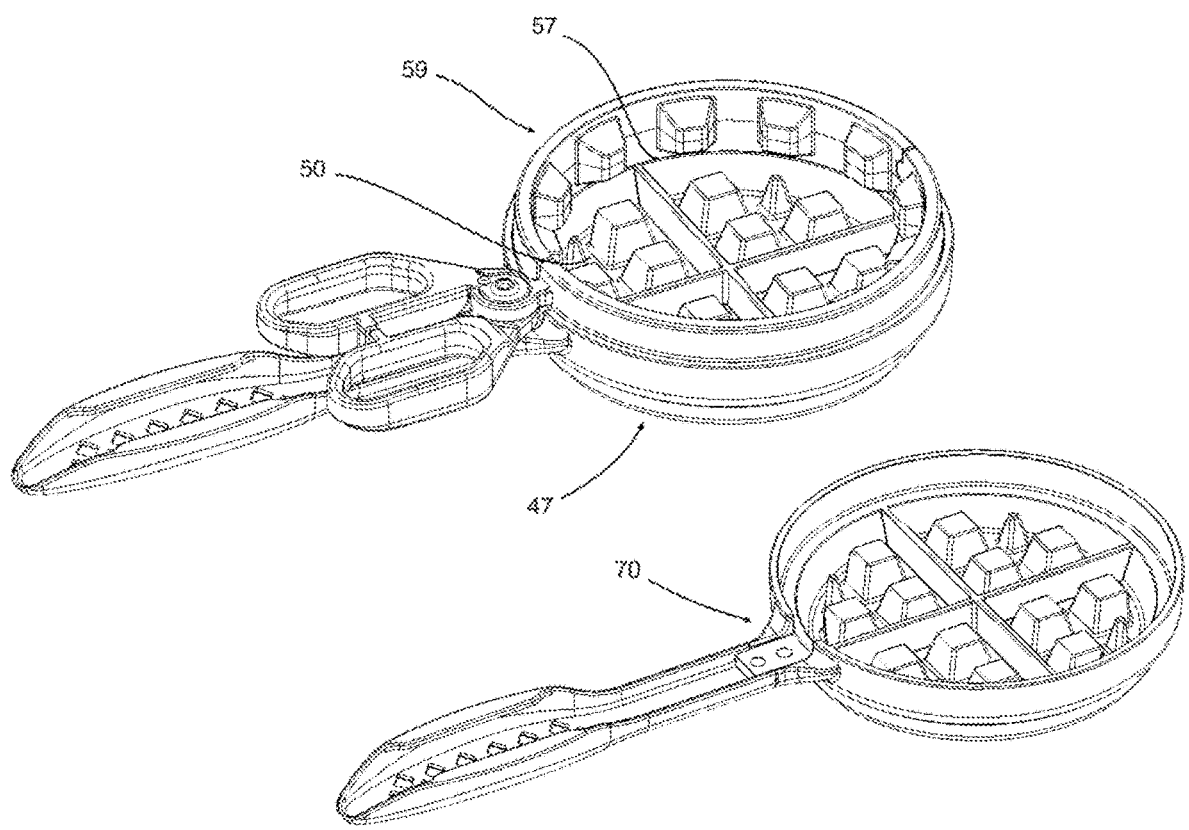
FIG. 10 is a top view of a cross-section of the device of FIG. 8 in an opened configuration.
Figure 11:
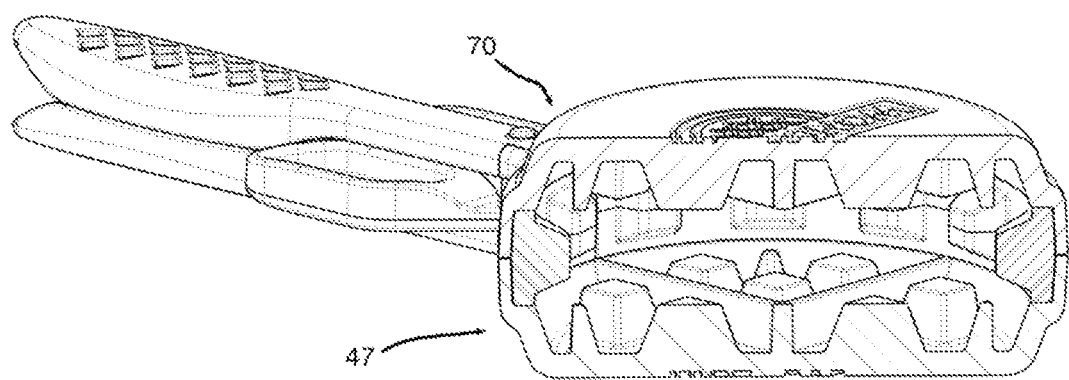
FIG. 11 is a top perspective view of a partially assembled device of FIG. 8.
Figure 12:
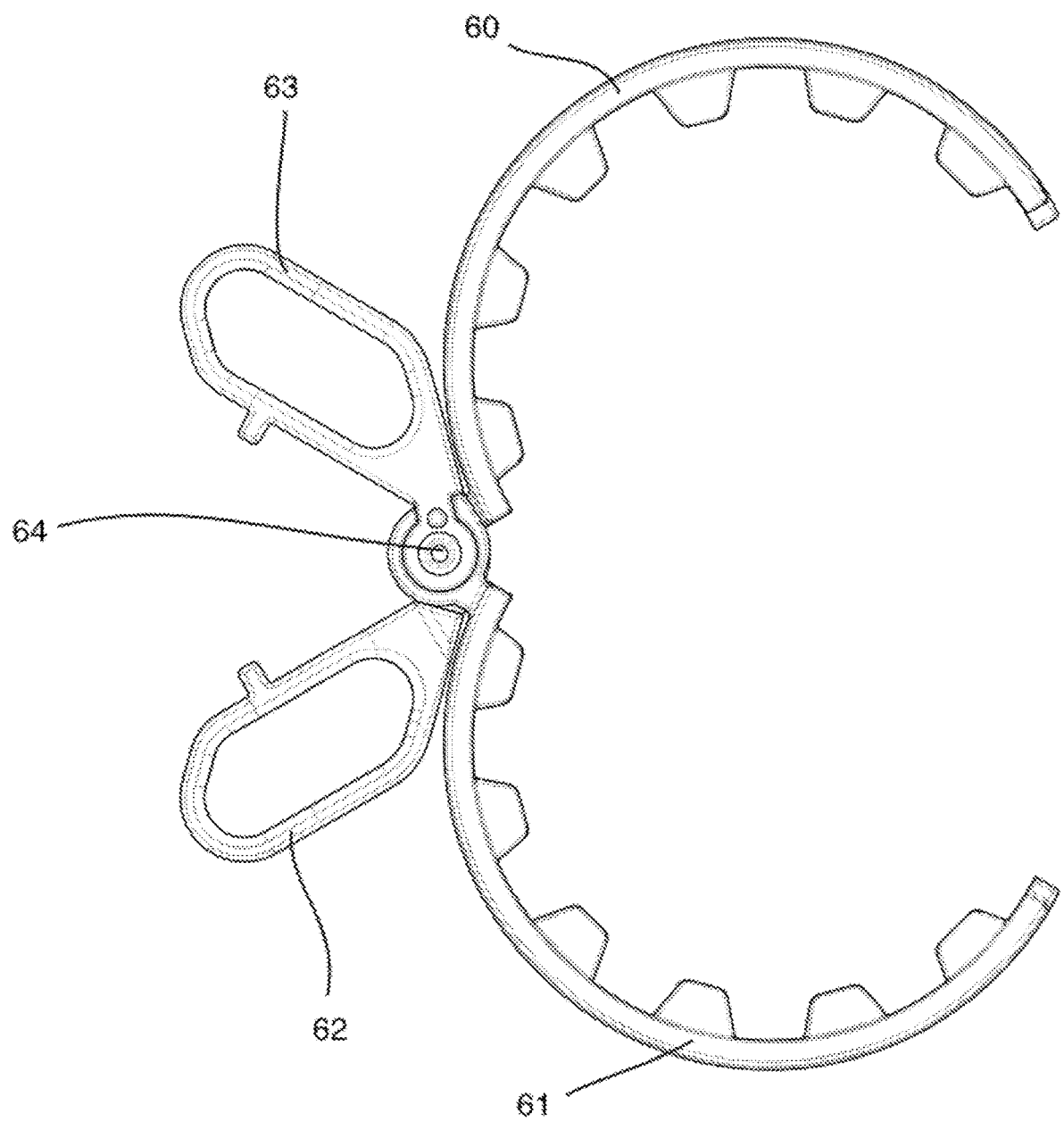
FIG. 12 is a top view of the opened scissor assembly of the device of FIG. 8.

FIGS. 10-12 depict the device's operation. In FIG. 10, the assemblies 47, 70 rests flat side down on top of a heating surface. Next, the scissor assembly 59 is placed on the flat top of the bottom plate support lip 57 to create a cavity 75 into which batter and ingredients are dispensed. The heating surface heats plates 48, 71, 60, 61 to a sufficient temperature to cook the batter. Batter (not shown) is then poured along the bottom surface 50 of the bottom plate to where it just covers the waffle features. Next, the filling ingredients (not shown) are placed into the batter. The cavity is filled when the remaining batter is then poured over the filling to just below the top of the side plate inserts. As shown in FIG. 11, the unit is closed by placing the top assembly 69 atop the bottom assembly 47. The entire unit is then flipped using handles 49, 72 to allow for an even distribution of batter inside the cavity such that the bottom assembly rests atop the scissor assembly 59 with the flat surface of the bottom plate 47 facing opposite the heating surface. During the cooking process, the entire unit may be flipped to cook the batter sufficiently on both sides.

Either bottom or top plate not resting on the heating surface may be removed during the cooking process to visually inspect doneness. The fully-cooked waffle is removed from the unit by lifting off the top assembly 70 using handle 72, placing thumb and index finger in the finger holes of handles 62, 63 to remove the scissor assembly 59 from the bottom assembly 47 and spread the handles 62, b3 apart to rotate the side plates 60, 61 along the hinge 64, as shown in FIG. 12, thereby releasing the fully-cooked stuffed waffle from the scissor assembly.

In this specification, the term "stuffed waffle" means fill ingredients substantially surrounded by a cooked waffle batter. The stuffed waffle is typically 1.75 to 2 inches thick and may include traditional waffle profile features along its top, bottom, and side surfaces, In this specification, the term "waffle batter" means a batter or dough composition.

In this specification, the term "fill ingredients" means one or more fruit, vegetables, or dairy products that do not require pre-cooking; or precooked fill ingredients.

In this specification, the term "precooked fill ingredients" means fruit, vegetables, or dairy products that are at least partially cooked prior to adding to a waffle .

Example

Figure 15:
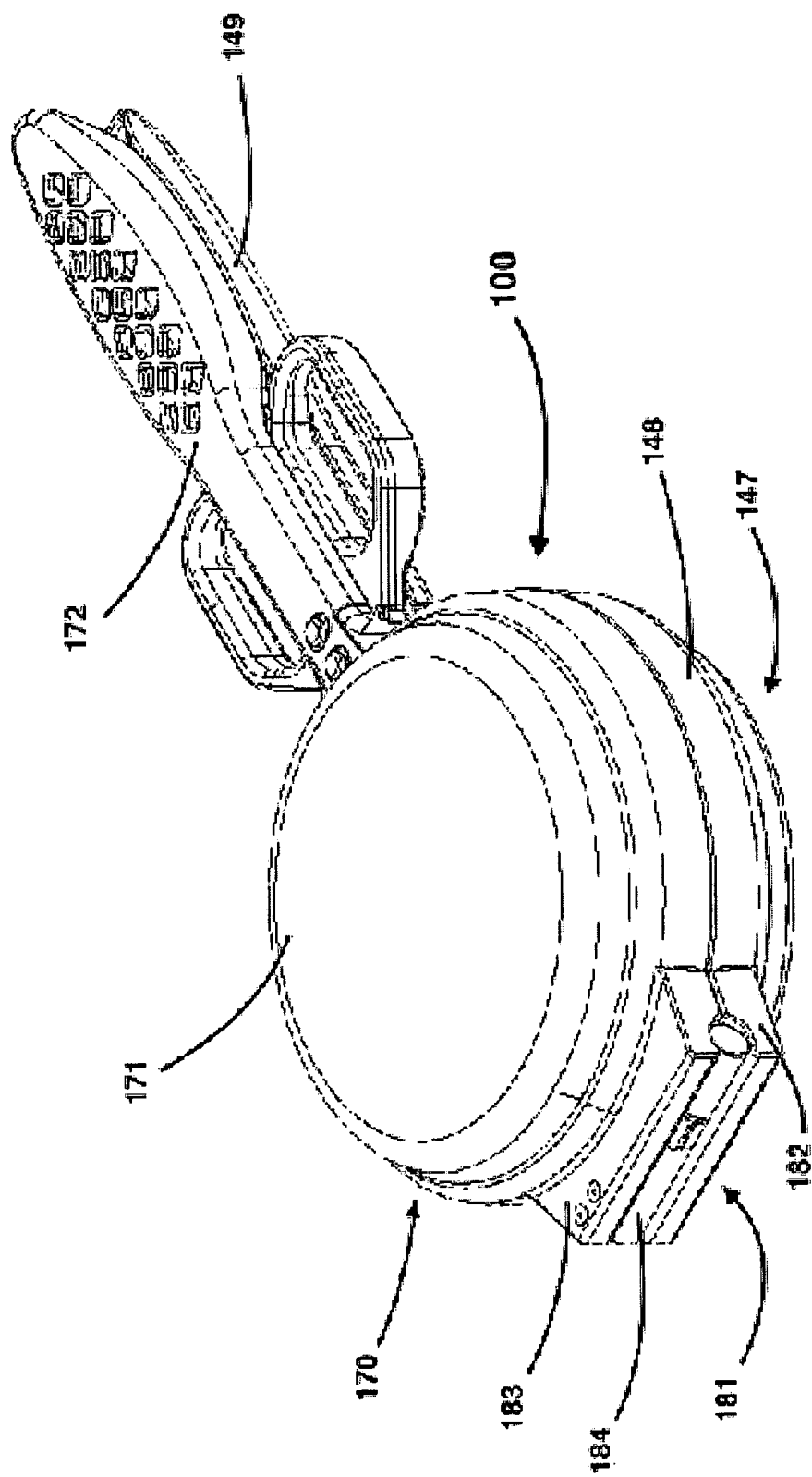
FIG. 15 is a top perspective view of the fourth embodiment of the device.

FIGS. 15-21 show a fourth example embodiment where a device 100 is provided to cook the stuffed waffle over a flame or electric burner. FIG. 15 is a diagram showing bottom assembly 147 attached to the top assembly 170 by way of a hinge assembly 181. In this example, the hinge assembly comprises of a bottom lip feature 182, a top lip feature 183 which is symmetric to the bottom lip feature, and a rotary shaft assembly 184. The bottom lip feature 182 is part of the bottom plate 148 and extends from it on the opposite side from the bottom handle 149. Likewise, the top lip feature 183 is part of the top plate 171 and extends from the top plate on the opposite side from the bottom handle 149 and top handle 172.

Figure 16:
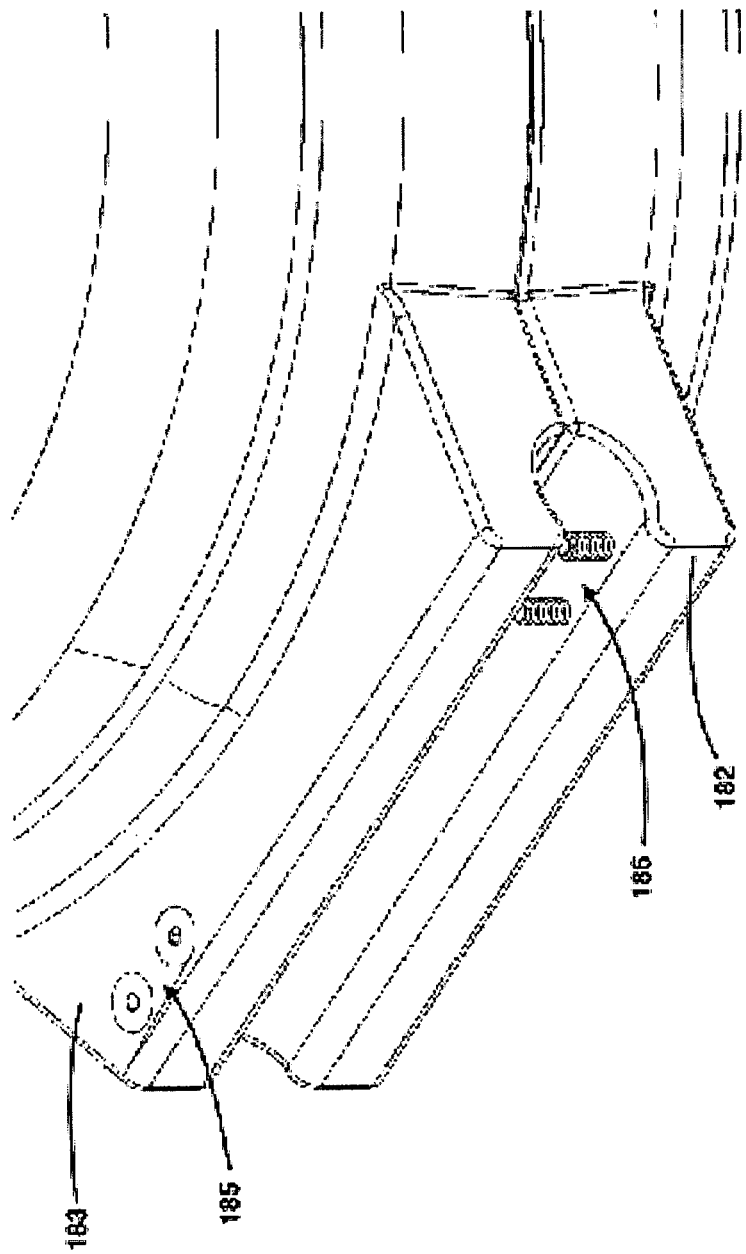
FIG. 16 is a top perspective view of the bottom lip feature and top lip feature of the device in FIG. 15.

FIG. 16 is a perspective diagram showing the bottom lip feature 182 and top lip feature 183. The rotary shaft assembly is attached to the bottom lip feature and top lip feature by way of bottom lip feature screws and top lip feature screws 185, 186.

Figure 17:
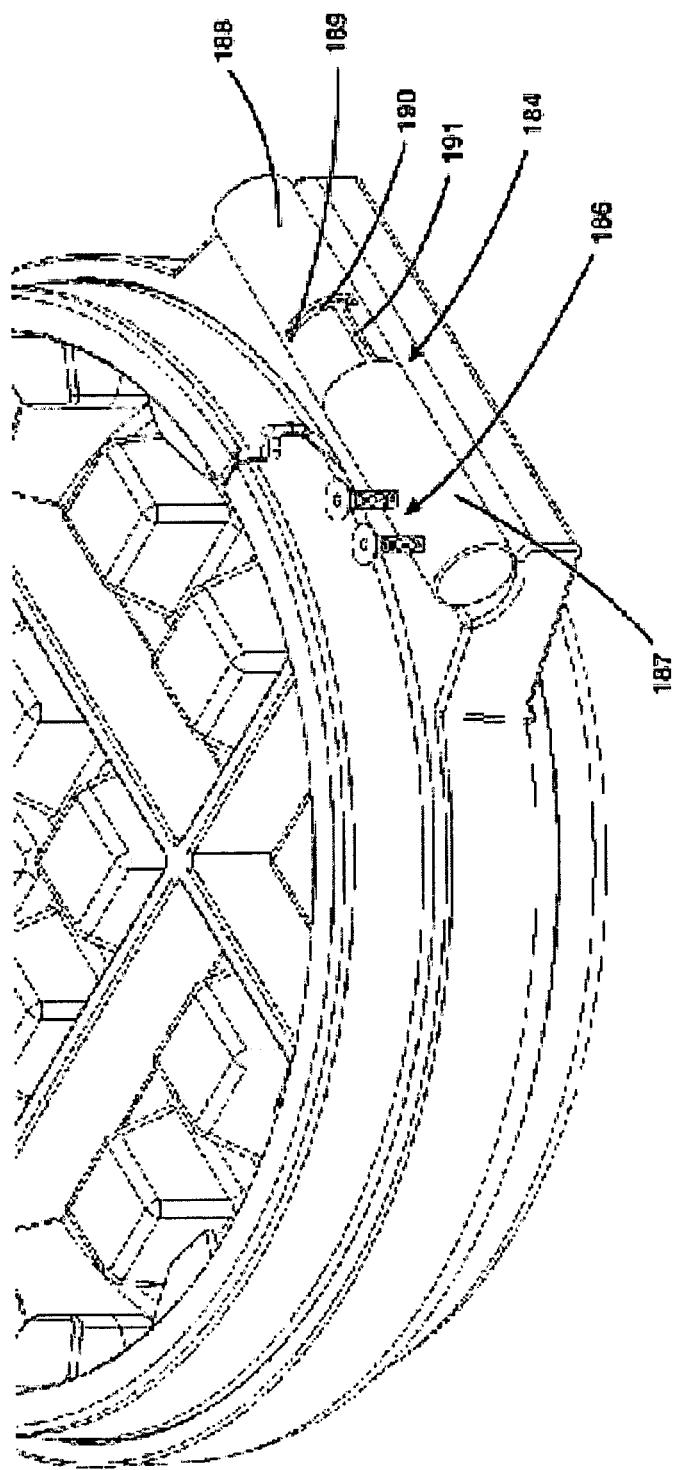
FIG. 17 is a top perspective view of the rotary shaft assembly of the device in FIG. 15.

FIG. 17 shows the rotary shaft assembly 184 which comprises a step-down male rotary shaft 187 and a slotted female rotary shaft 188. The male rotary shaft has a key 189 that protrudes out from the shaft and fits into the female rotary shaft along a vertical and horizontal slotted path 190, 191. The male rotary shaft is attached to the top plate (not shown) with the top lip feature screws 186.

Figure 18:
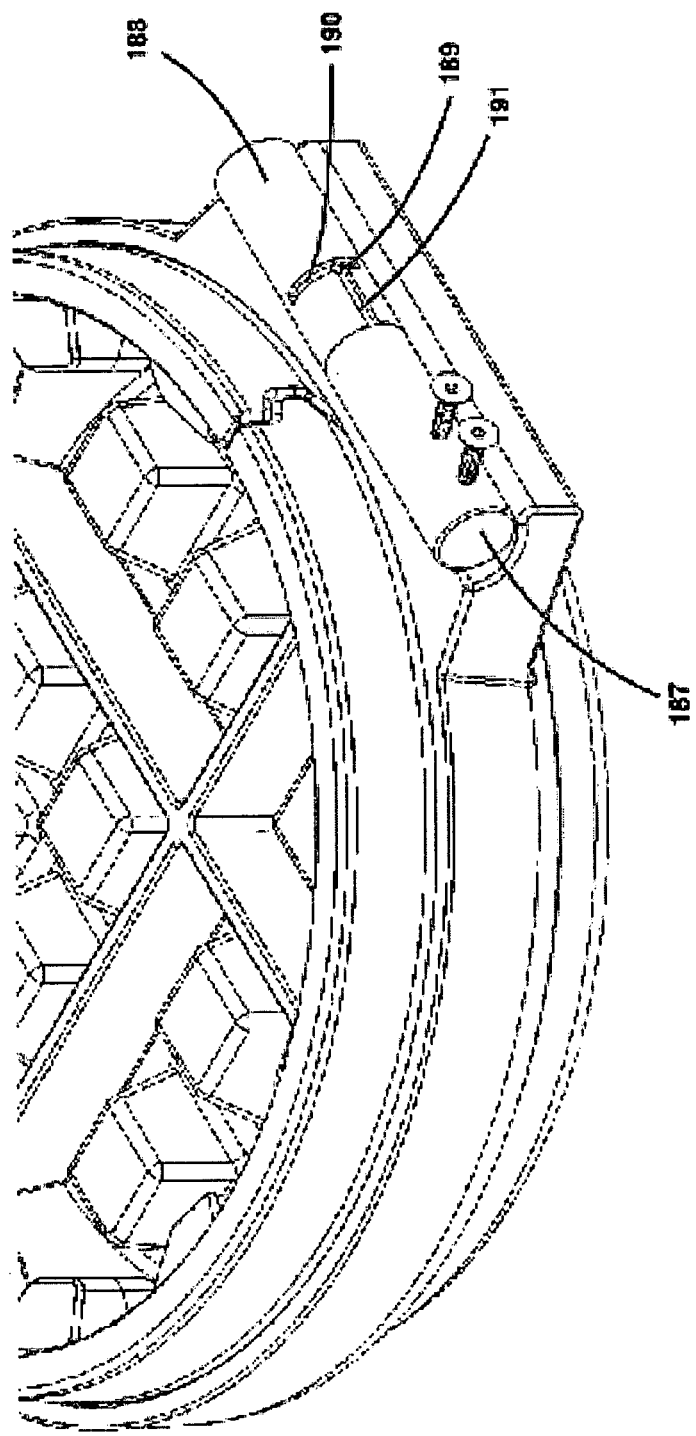
FIG. 18 is a top perspective view of the first step in separating the rotary shaft assembly of FIG. 17.
Figure 19:
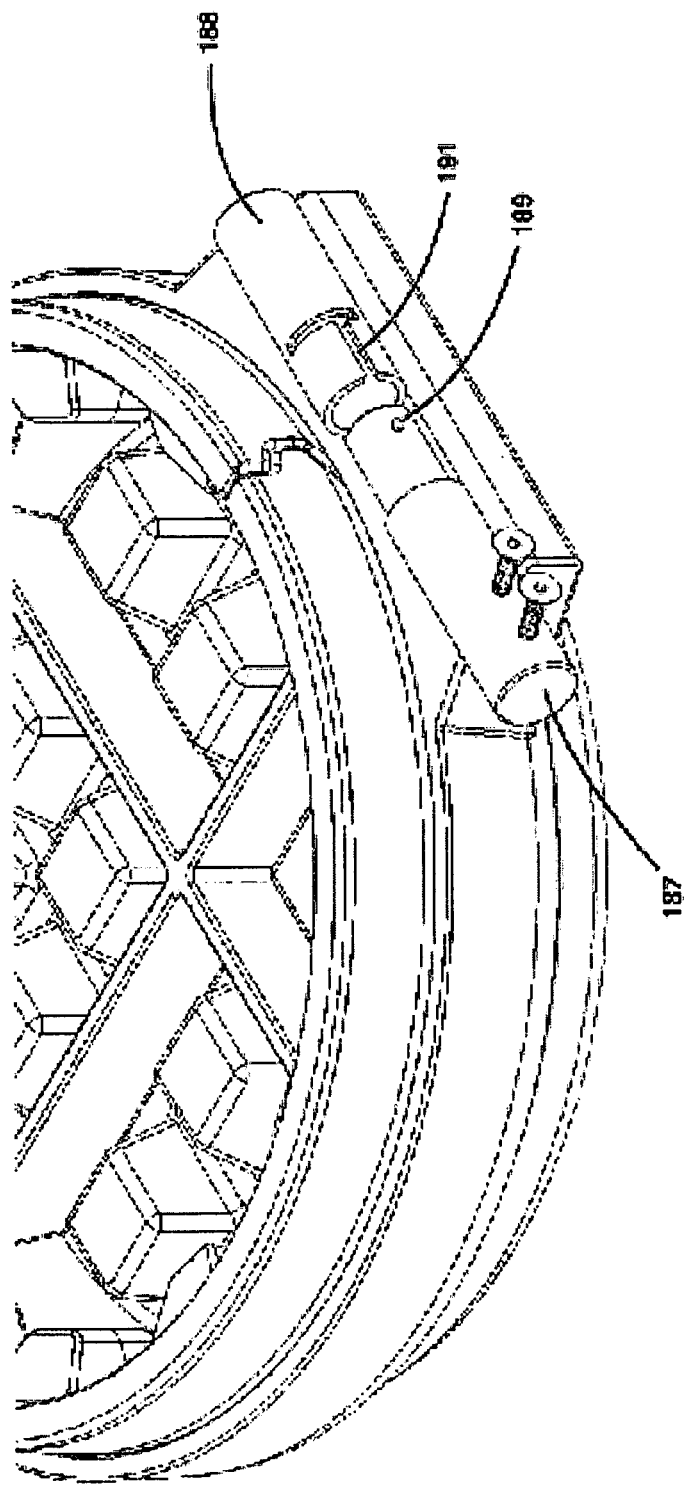
FIG. 19 is a top perspective view of the second step in separating the rotary shaft assembly of FIG. 17.

FIGS. 18-19 show the operation of separating the male rotary shaft from the female rotary shaft. In FIG. 18, the male rotary shaft 187 is rotated along its center axis, allowing the key 189 to move along the vertical slotted path 190 of the female rotary shaft 188 until it reaches the horizontal slotted path 191 of the female rotary shaft. In FIG. 19, the male rotary shaft 187 is pulled horizontally away from the female rotary shaft 188 such that its key 189 moves along the horizontal path 191 of the female rotary shaft.

Figure 20:
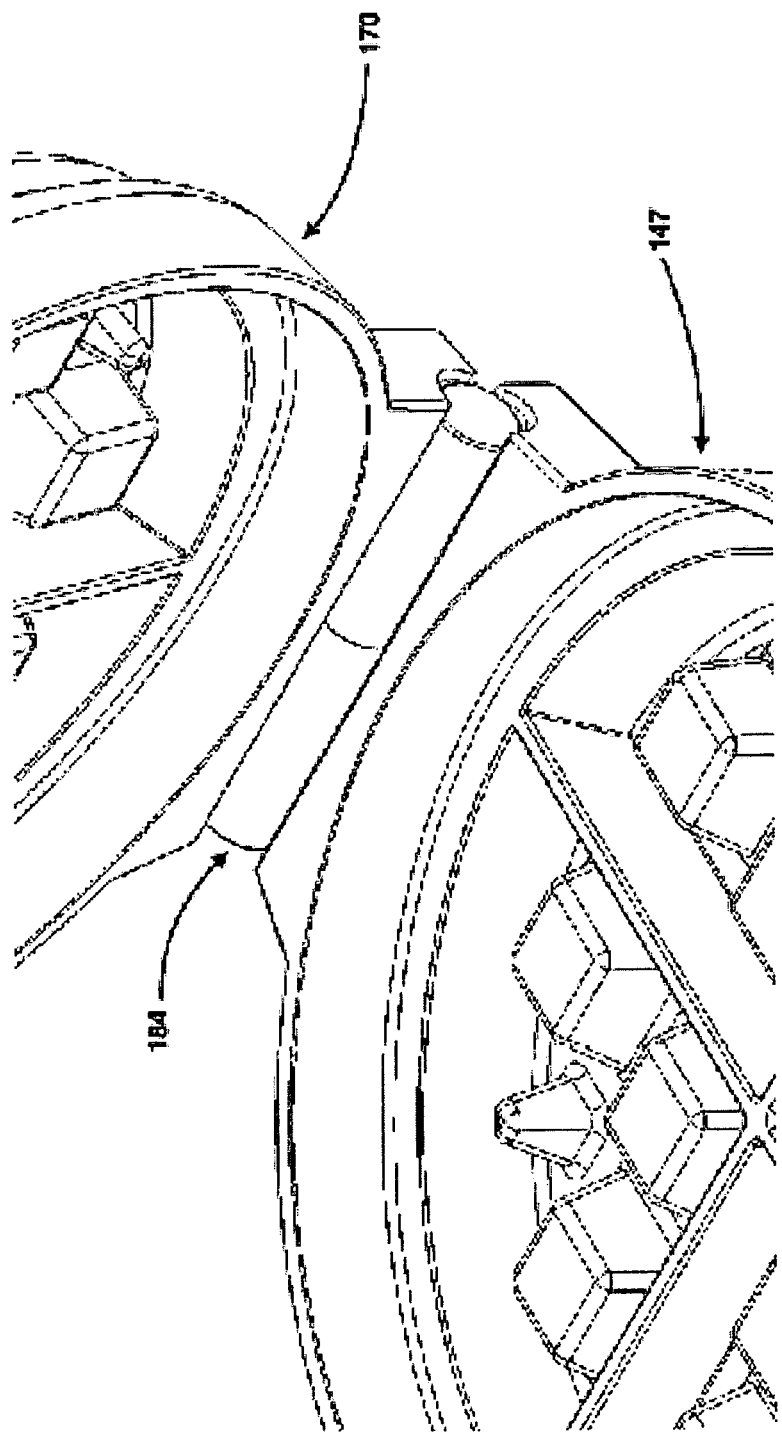
FIG. 20 is an alternate top perspective view of the first step in separating the rotary shaft assembly of FIG. 17.
Figure 21:
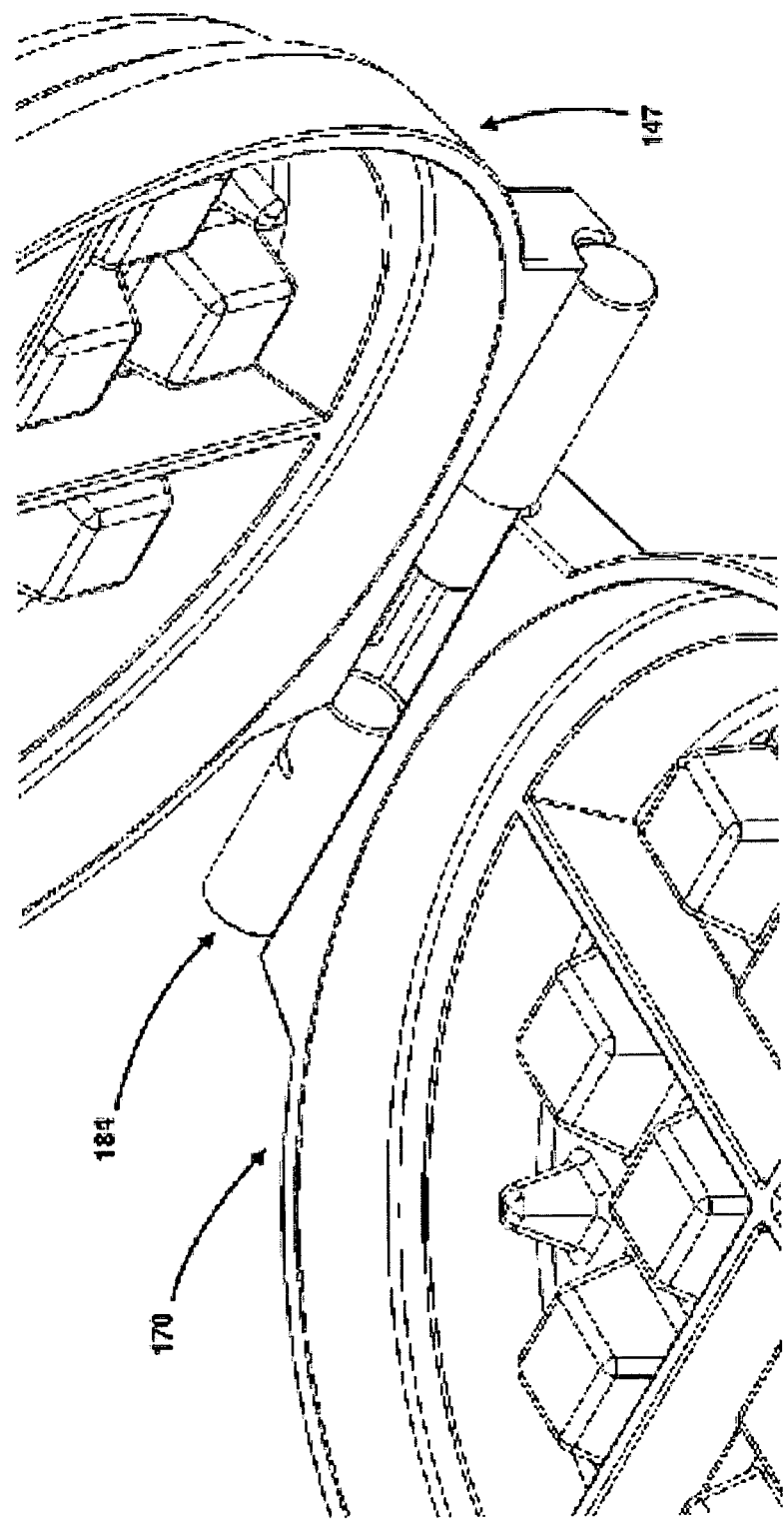
FIG. 21 is an alternate top perspective view of the second step in separating the rotary shaft assembly of FIG. 17.

FIGS. 20-21 show an alternate perspective of the separation of the top assembly 147 from bottom assembly 170 along the rotary shaft assembly 184.

Example

Figure 22:
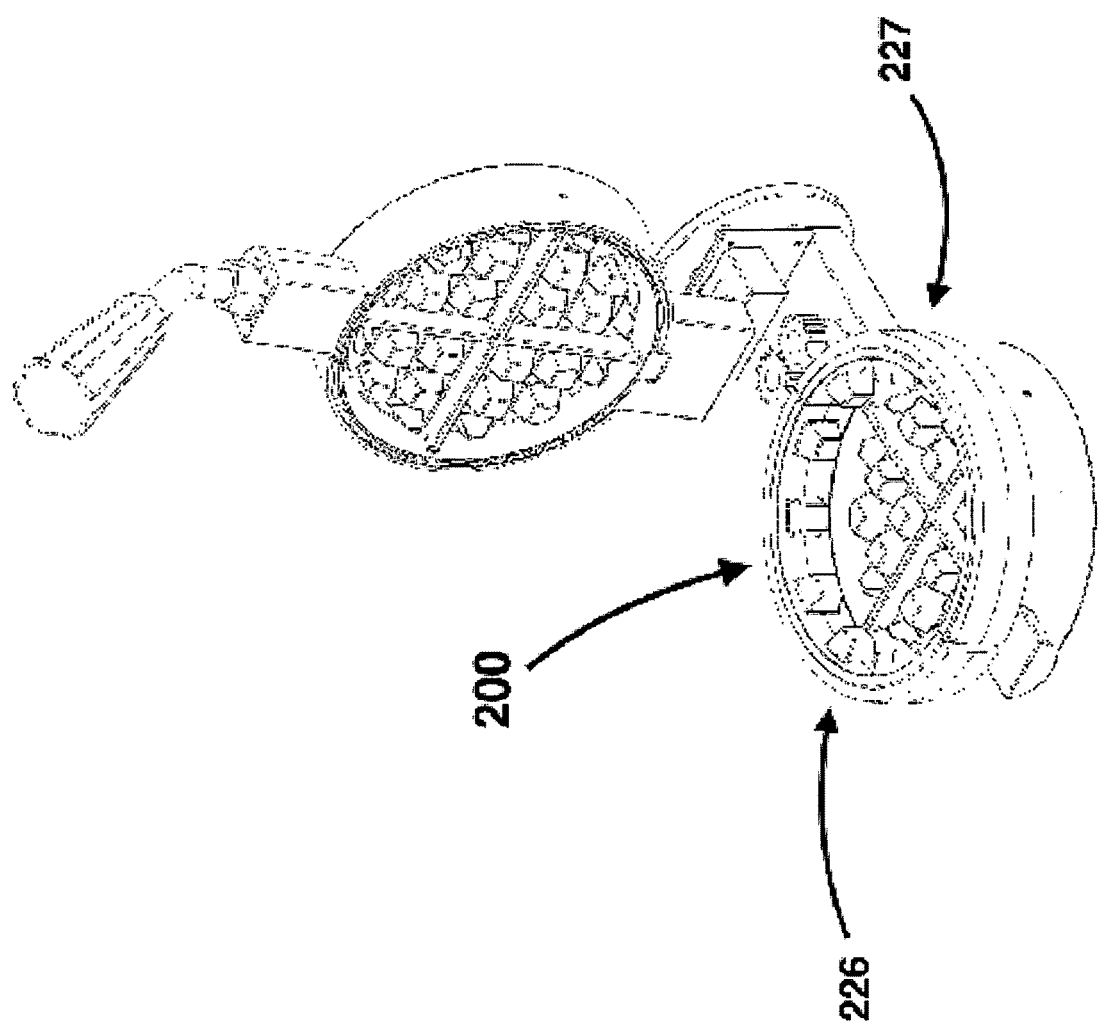
FIG. 22 is a top perspective view of the fifth embodiment of the device with middle ring sections in a closed orientation.
Figure 23:
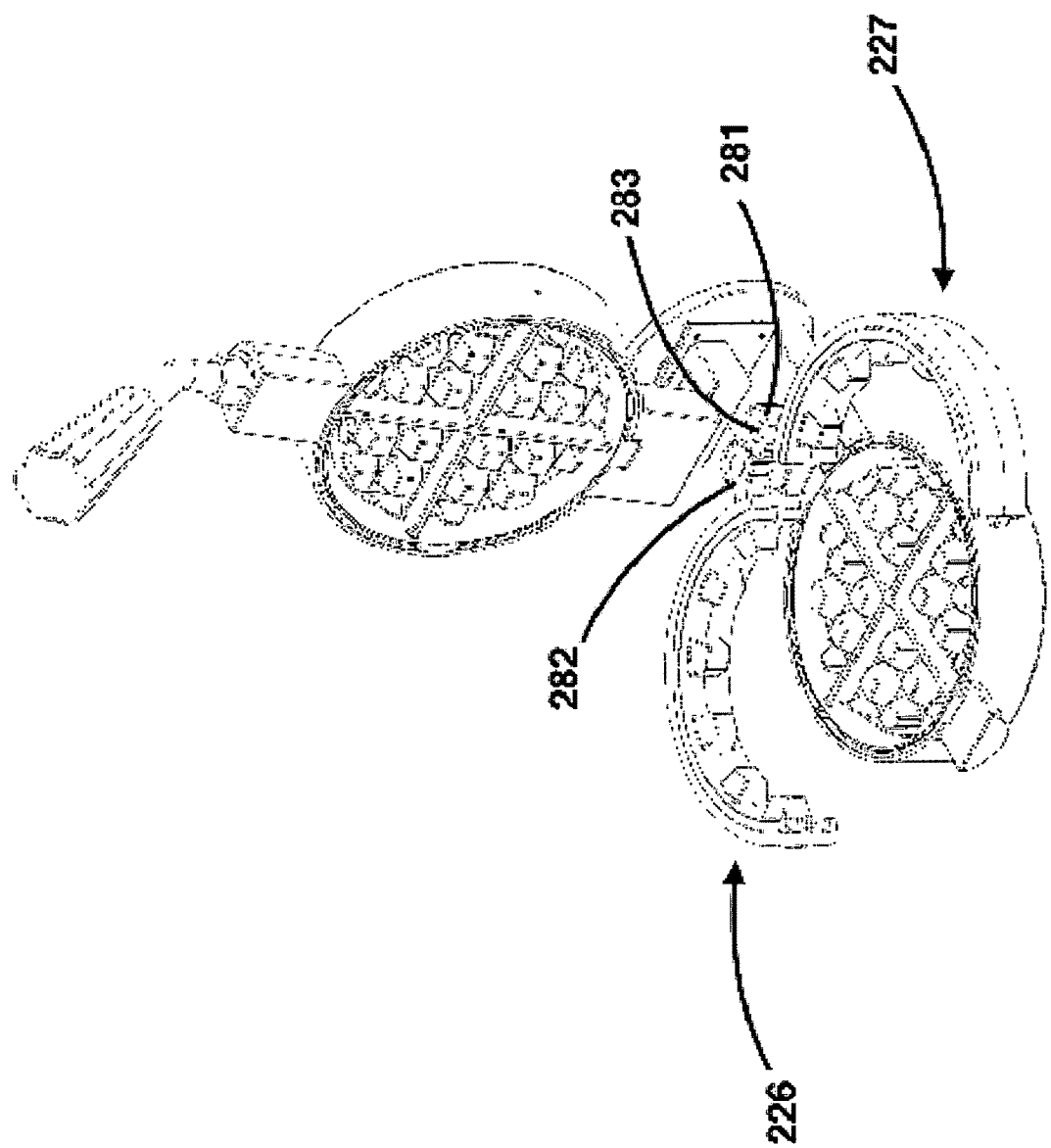
FIG. 23 is a top perspective view of the fifth embodiment of the device with middle ring sections in a partially opened orientation.

FIGS. 22-23 show a fifth example embodiment where the device 200 is heated directly from an electrical source, and whose side plates are opened using attached gears. FIG. 22 shows the side plates 226, 227 in their closed position. FIG. 23 shows the side plates 226, 227 in their opened orientation as the gears 281, 282 are driven to an open orientation. In this example, a first gear 281 is rotated along its shaft 283, and the teeth of the first gear open side plate 227 and drive the teeth of the second gear 282 causing it to rotate in the opposite direction and open side plate 226. The gear rotation may be powered either by electrical or manual means.

Example

Figure 24:
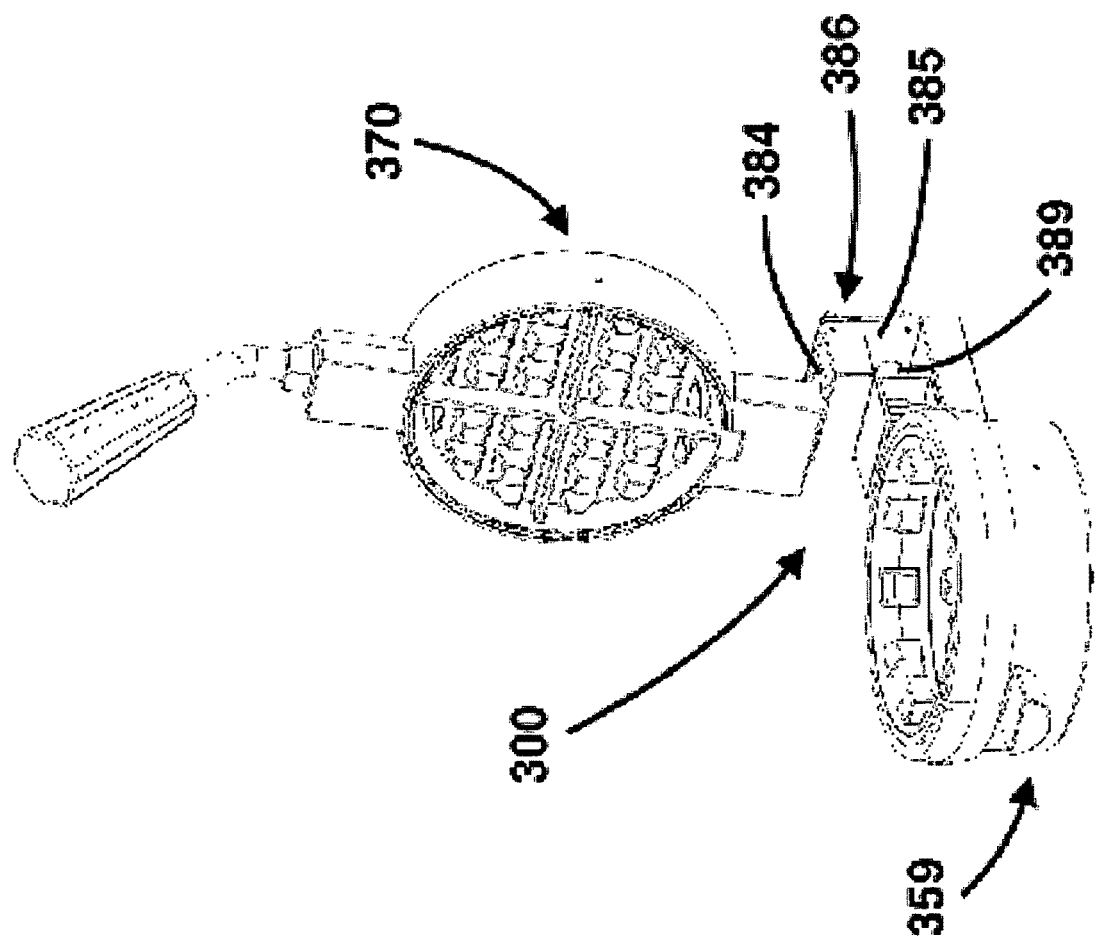
FIG. 24 is a top perspective view of the sixth embodiment of the device with a scissor assembly.

FIG. 24 is a top perspective diagram of a sixth example embodiment, which is convertible between a stuffed waffle maker and a conventional waffle maker, showing the device 300 in the opened position in its stuffed waffle configuration. The top assembly 370 rotates on the top assembly hinge 384 to the open position. A side plate scissor assembly 359 rests atop the bottom assembly 347. In this example, as the upper plate is moved between a raised orientation and a lowered orientation, a support pin 386 is moved along an inverted "C" shaped slot 389 provided in a rear plate 385.

Figure 25:
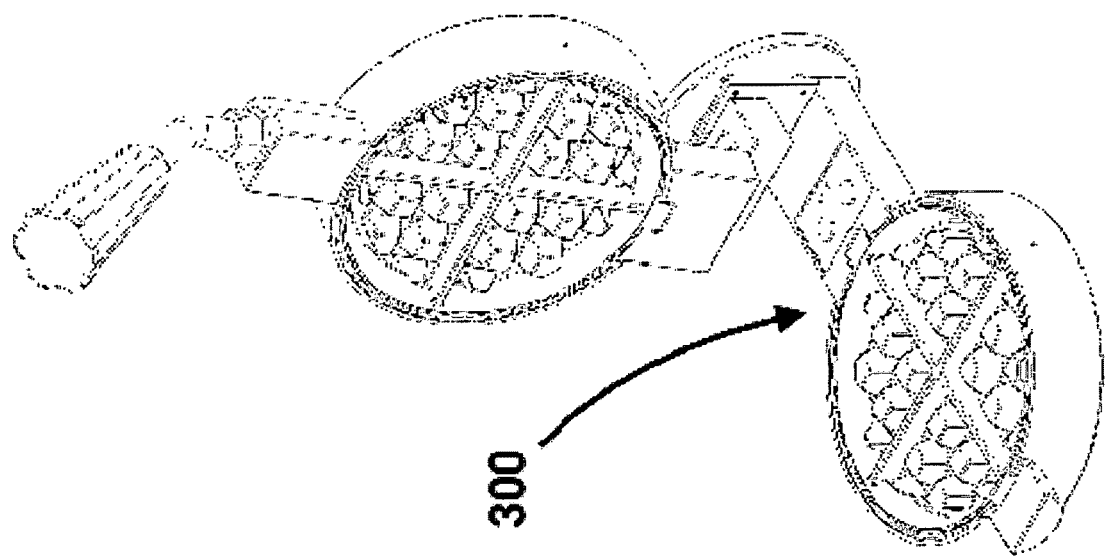
FIG. 25 is a top perspective view of the device of FIG. 24 with the scissor assembly removed.
Figure 26:
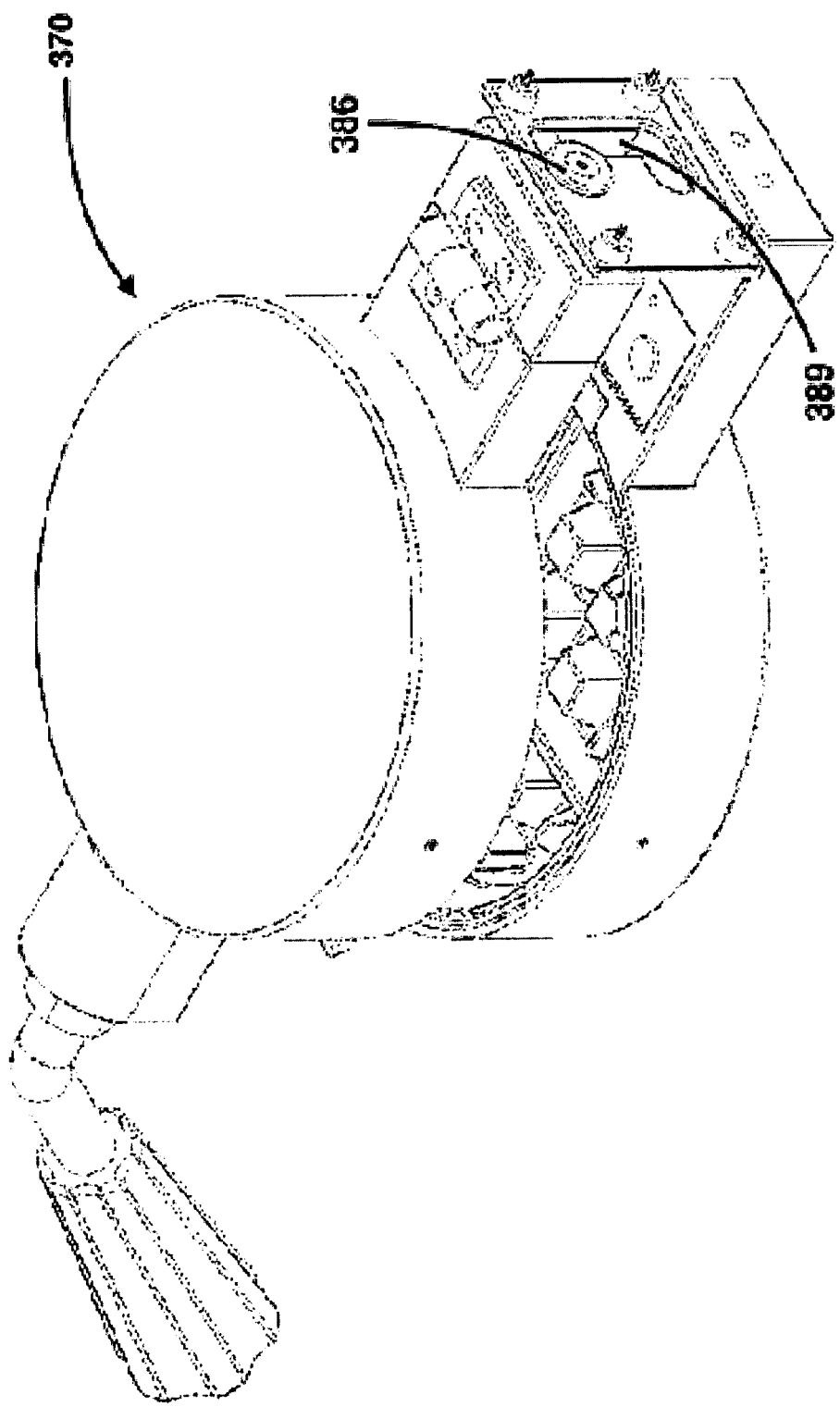
FIG. 26 is a top perspective view of the first step of converting the device of FIG. 24 from the stuffed waffle configuration to the conventional waffle configuration.
Figure 27:
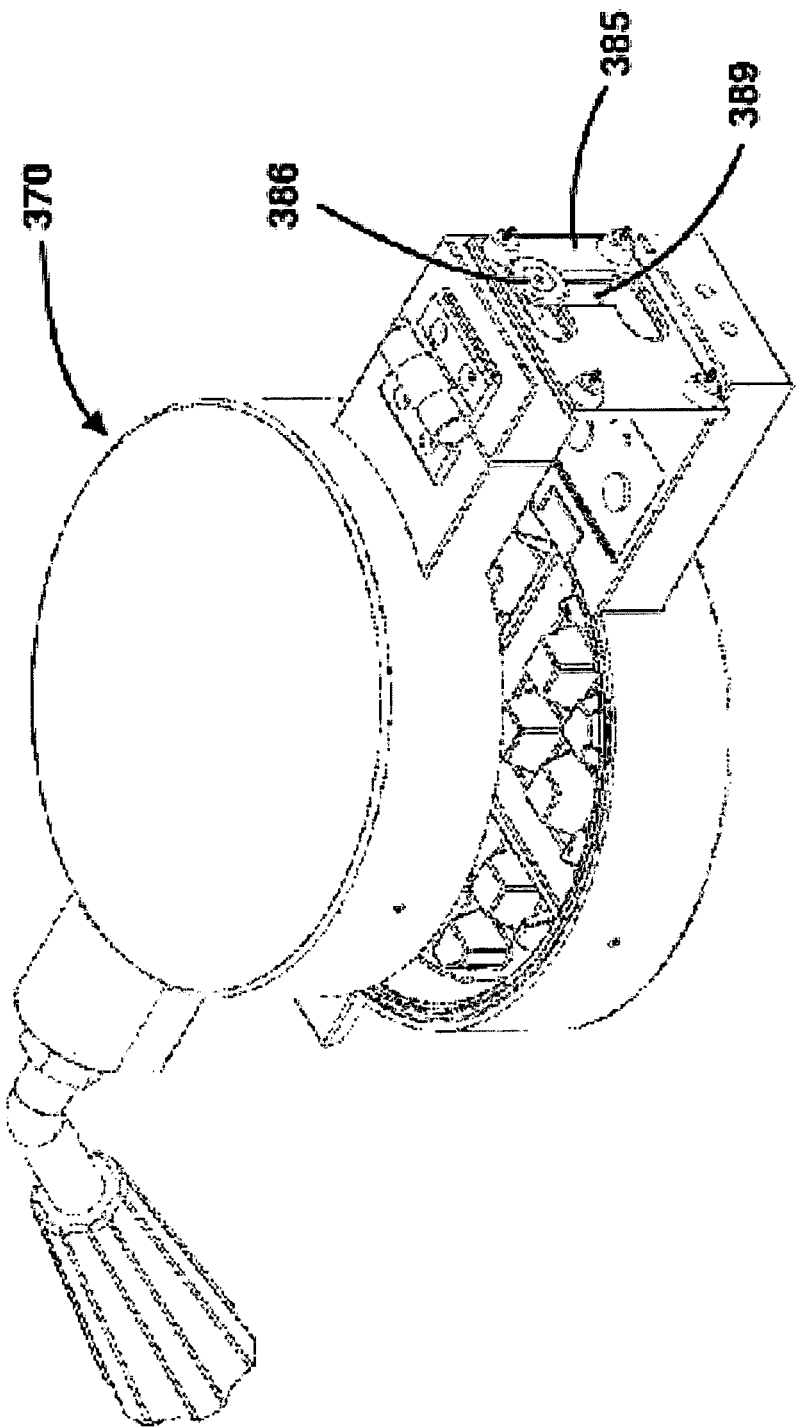
FIG. 27 is a top perspective view of the second step of converting the device of FIG. 24 from the stuffed waffle configuration to the conventional waffle configuration.
Figure 28:
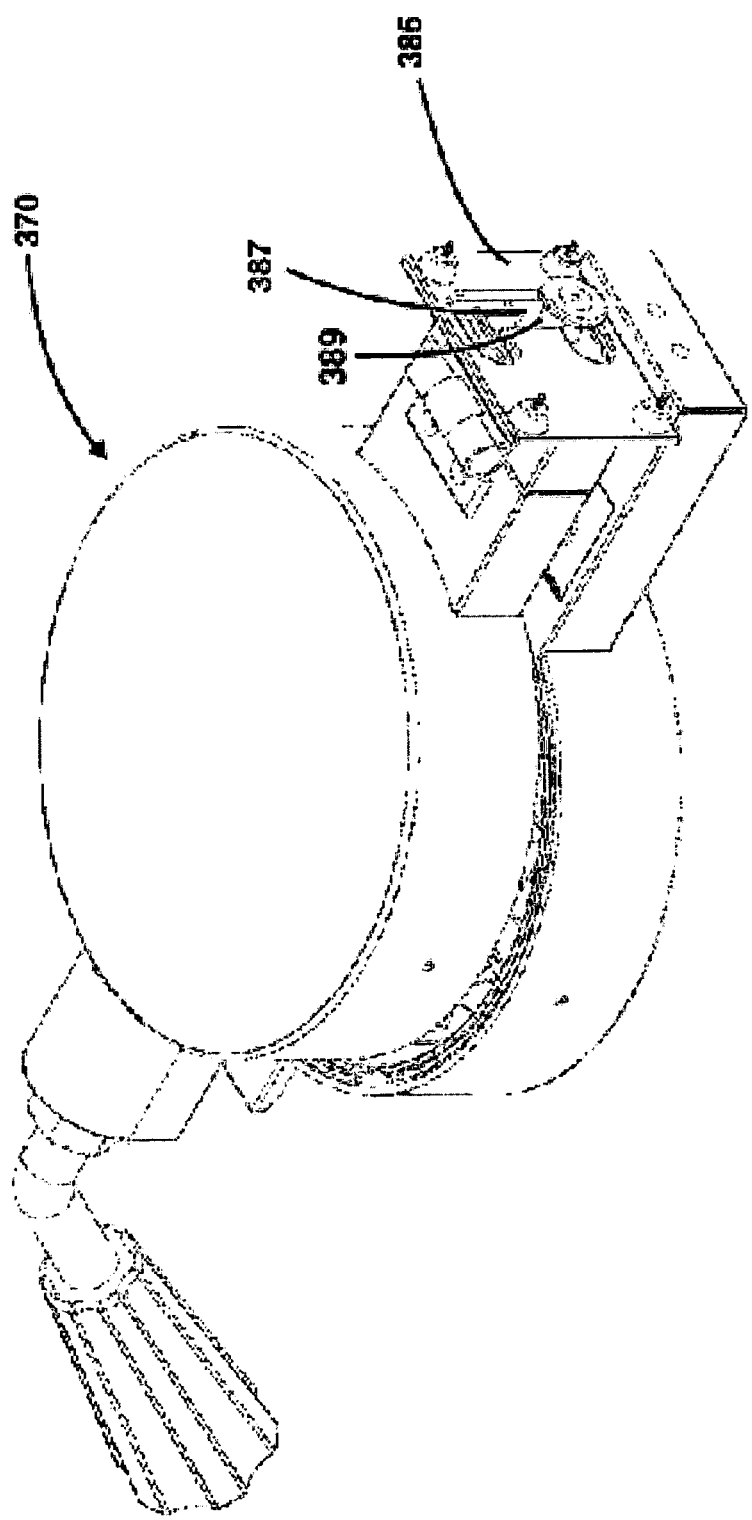
FIG. 28 is a top perspective view of the third step of converting the device of FIG. 24 from the stuffed waffle configuration to the conventional waffle configuration.
Figure 29:
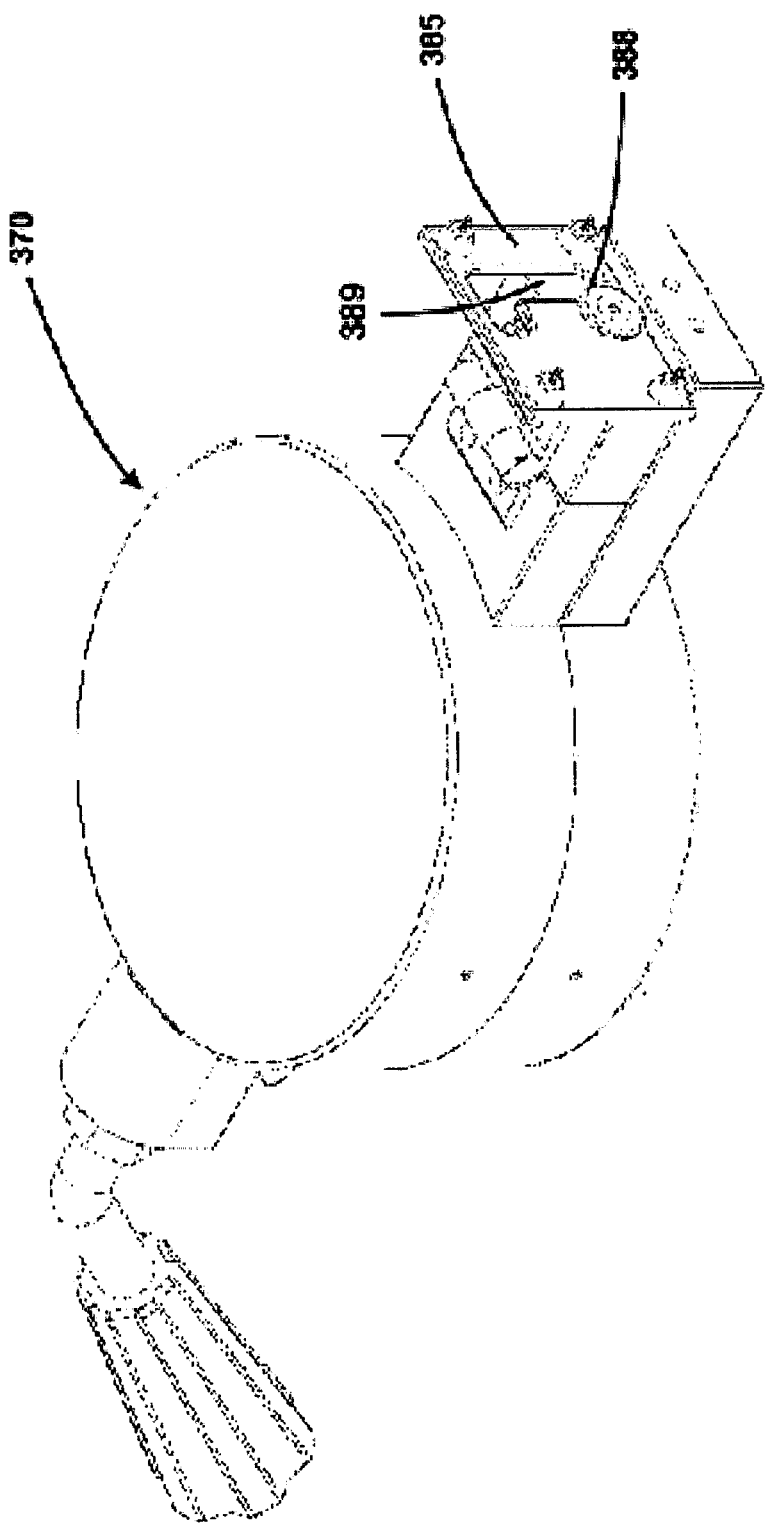
FIG. 29 is a top perspective view of the fourth step of converting the device of FIG. 24 from the stuffed waffle configuration to the conventional waffle configuration.
Figure 30:
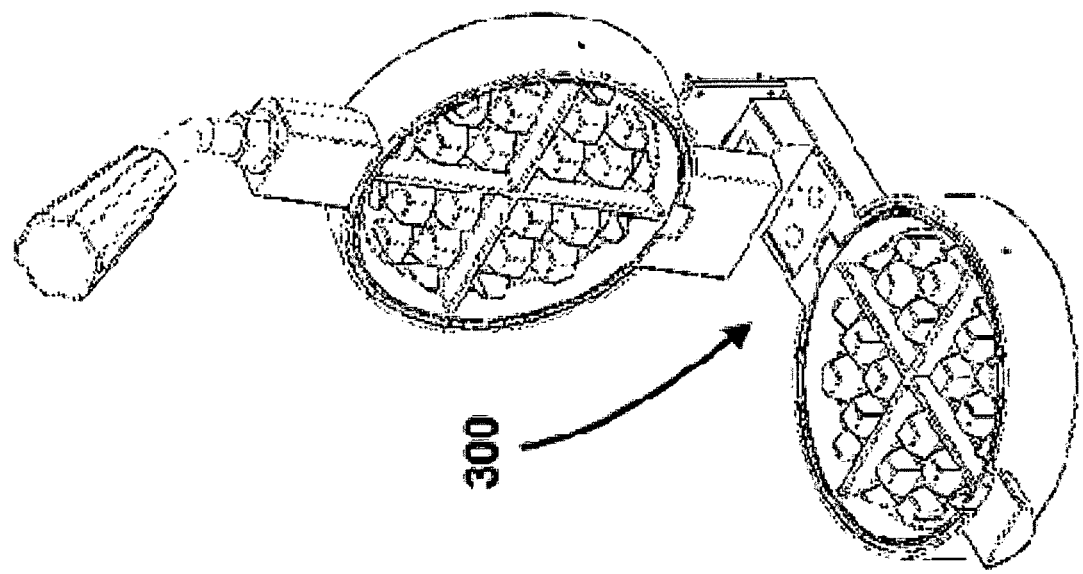
FIG. 30 is a top perspective view of the device of FIG. 24 in the conventional waffle configuration.

FIGS. 25-29 depict the operation of converting from a stuffed waffle maker to a conventional waffle maker. In FIG. 25, the scissor assembly has been removed from the device 300. In FIG. 26, the top assembly 370 is lowered to its closed position. Pin 386 is shown nested in the upper left portion of inverted "C" slot 389 in order to hold the top plate at an elevated height. In FIG. 27, the top assembly 370 is moved to the right relative to the rear support plate 385, so that pin 386 is moved to the upper right portion of inverted "C" slot 389. In FIG. 28, the top assembly 370 is lowered down the vertical portion 387 of slot 389 of the rear support plate 385. In FIG. 29, the top assembly 370 is moved along the bottom horizontal portion 388 of inverted "C" slot 389 of the rear support plate 385. FIG. 30 shows the device 300 in its open position in the conventional waffle configuration.

The waffle product cooked by all embodiments may be made from traditional pancake/waffle batter of a sweet variety or a savory batter, depending on the recipe. Filling ingredients, which are expected to be pre-cooked, may include fruit and cream mixtures; breakfast items such as bacon, sausage, eggs, and cheese; meats such as chicken or hamburger patties; or desserts such as ice cream. In addition, the device may be used to prepare non-waffle recipes such as spanakopita, saag paneer, cookies, cake or brownies, each having a unique waffle shape.

Figure 13:
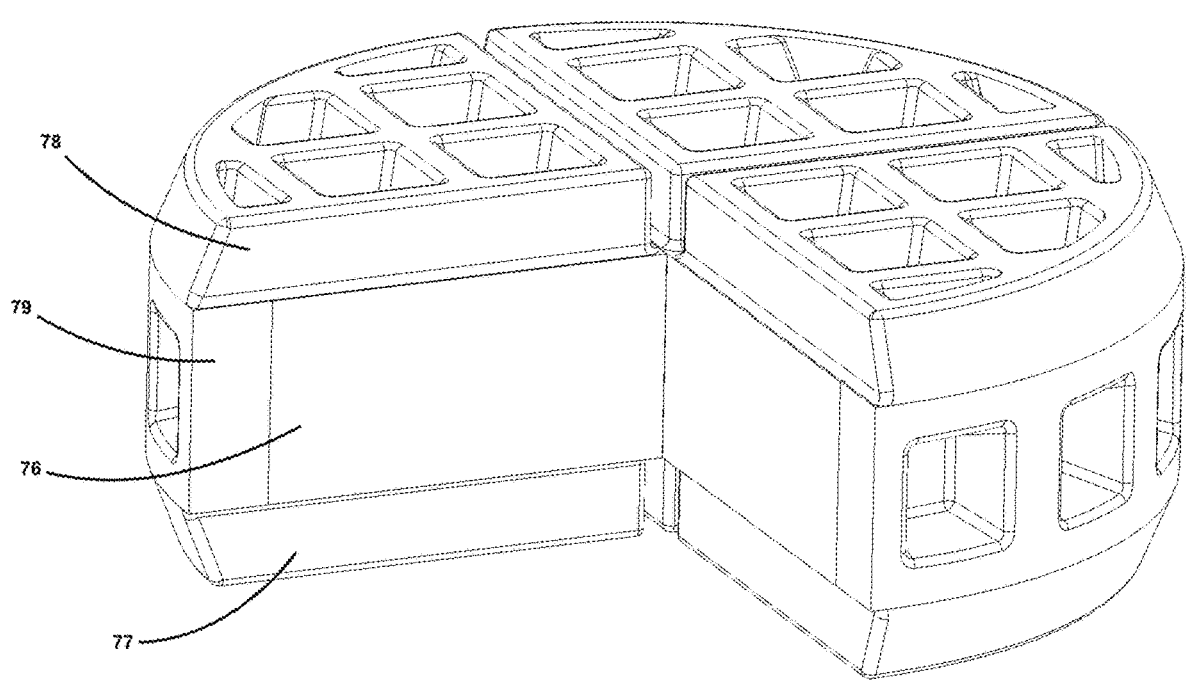
FIG. 13 is a top perspective view of the stuffed waffle showing a cross section of the food product.
Figure 14:
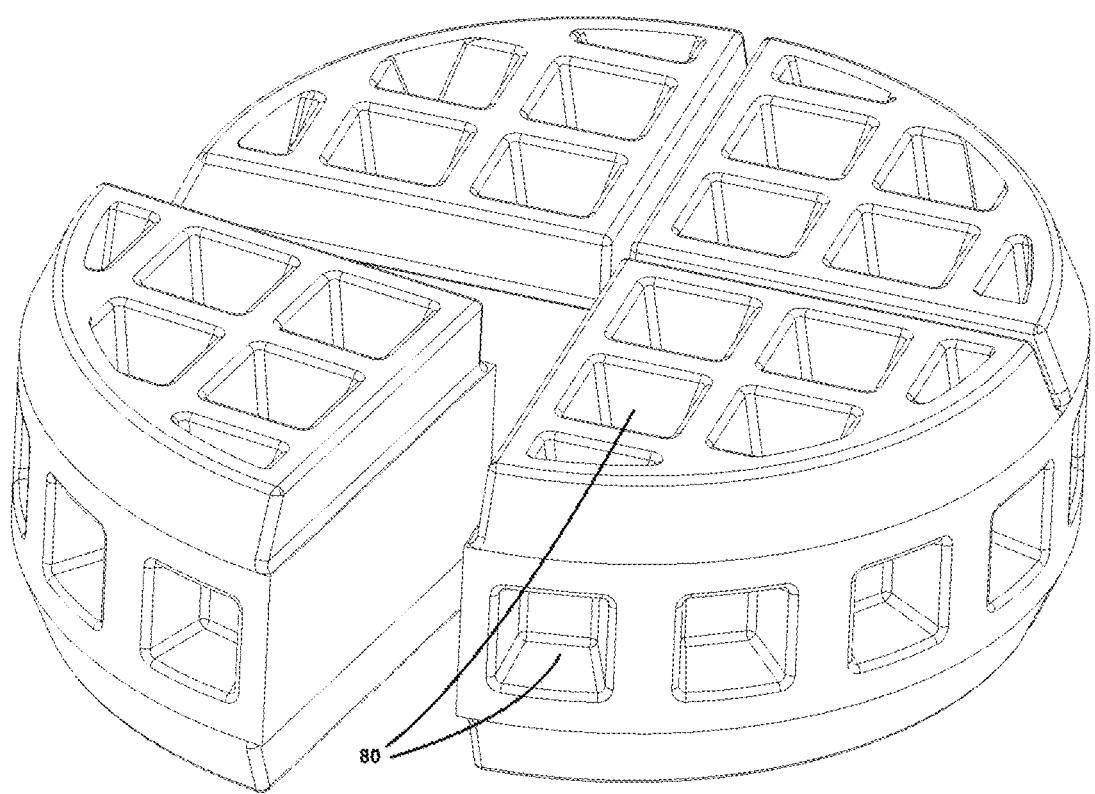
FIG. 14 is a photograph of the stuffed waffle cooked using the device in FIG. 2.

FIG. 13 is a top perspective view of the waffle showing a cross section of the food product with an internal filling 76 enclosed by the bottom, top and side surfaces, 77, 78, 79, respectively. FIG. 14 is a photo of a product cooked having a waffle pattern 80 on all surfaces.

While an exemplary embodiment of the device has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A stuffed waffle cooking device comprising
    a bottom pan comprising
        an interior surface comprising a plurality of indented gridlike waffle features,
        an exterior surface, and
        a recessed circumferential lip;
    a top pan comprising
        an interior surface comprising a plurality of indented gridlike waffle features,
        an exterior surface, and
        a recessed circumferential lip;
    a first side plate insert comprising
        an interior surface and an exterior surface,
        a first end portion comprising a first handle portion,
        a second end portion,
        a top edge, and a bottom edge, such that the bottom edge is configured to nest in a portion of the bottom pan recessed circumferential lip, and the top edge is configured to nest in a portion of the top pan recessed circumferential lip when the top pan is inverted over the bottom pan;
    a second side plate insert comprising
        an interior surface and an exterior surface,
        a first end portion comprising a second handle portion,
        a second end portion, such that the first handle portion and second handle portion are connected at a hinge, such that the second end portion of the first side plate insert and the second end portion of the second side plate insert are drawn together when the first handle portion and second handle portion are squeezed together in scissor motion, and are moved apart when the first handle portion and second handle portion are pulled apart in scissor motion,
        a top edge, and a bottom edge, such that the bottom edge is configured to nest in the portion of the bottom pan circumferential lip, and the top edge is configured to nest in the portion of the top pan circumferential lip when the top pan is inverted over the bottom pan; and
    a hinge assembly comprising
        a hinge support plate comprising an inverted "C" shaped slot,
        a support pin configured to move between an elevated resting position at a top end of the "C" shaped slot, and a lower resting position at a lower end of the "C" shaped slot, and
        a hinge having
            a first side attached to the top plate, and
            a second side supported by the support pin, such that the hinge assembly has a first orientation where the top pan is spaced apart from the bottom plate to accommodate the first and second side plate inserts, and a second orientation where the recessed circumferential lip of the top pan may be closed to the recessed circumferential lip of the bottom pan.

2. The stuffed waffle cooking device of claim 1 wherein the bottom pan further comprises a handle; and the top pan further comprises a handle.

3. The stuffed waffle cooking device of claim 1 wherein a plurality of indented gridlike waffle features are provided on the interior surface of the first side plate insert and the interior surface of the second side plate insert.

4. The stuffed waffle cooking device of claim 3 wherein the plurality of indented gridlike waffle features on an interior surface of the split ring are arranged circumferentially.

5. The stuffed waffle cooking device of claim 1 further comprising an electric heating mechanism.

6. An electric stuffed waffle cooking device comprising
    a bottom pan comprising
        an interior surface comprising a plurality of indented gridlike waffle features,
        an exterior surface, and
        a recessed circumferential lip;
    a top pan comprising
        an interior surface comprising a plurality of indented gridlike waffle features,
        an exterior surface, and
        a recessed circumferential lip;
    a first side plate comprising
        an interior surface and an exterior surface, a first end portion and a second end portion,
a top edge, and a bottom edge, such that the bottom edge is configured to nest in a portion of the recessed circumferential lip of the bottom pan circumferential lip, and the top edge is configured to nest in a portion of the recessed circumferential lip of the top pan circumferential lip when the top pan is inverted over the bottom pan;

a second side plate comprising
an interior surface and an exterior surface,
a first end portion and a second end portion,
a top edge, and a bottom edge, such that the bottom edge is configured to nest in a portion of the recessed circumferential lip of the bottom pan circumferential lip, and the top edge is configured to nest in a portion of the recessed circumferential lip of the top pan circumferential lip when the top pan is inverted over the bottom pan;

a plurality of electric heating elements; and a gear assembly comprising
a motor-driven first gear configured to open and close the first side plate; and
a second gear, driven by the first gear, configured to open and close the second side plate.

7. A stuffed waffle cooking device comprising
a bottom pan comprising
an interior surface comprising a plurality of indented gridlike waffle features,
an exterior surface, and
a recessed circumferential lip;

a top pan comprising
an interior surface comprising a plurality of indented gridlike waffle features,
an exterior surface, and
a recessed circumferential lip;

a first side plate comprising
an interior surface and an exterior surface,
a first end portion and a second end portion,
a top edge, and a bottom edge, such that the bottom edge is configured to nest in a portion of the recessed circumferential lip of the bottom pan, and
the top edge is configured to nest in a portion of the recessed circumferential lip of the top pan when the top pan is inverted over the bottom pan;

a second side plate comprising
an interior surface and an exterior surface,
a first end portion and a second end portion,
a top edge, and a bottom edge, such that the bottom edge is configured to nest in a portion of the recessed circumferential lip of the bottom pan, and
the top edge is configured to nest in a portion of the recessed circumferential lip of the top pan when the top pan is inverted over the bottom pan; such that the internal surface of the top pan, the internal surface of the bottom pan, the internal surface of the first side plate, and the internal surface of the second side plate are configurable to provide a single cavity to surround and cook a single stuffed waffle, and a hinge assembly comprising
a bottom lip,
a top lip, and
a rotary shaft assembly attached to the bottom lip, the rotary shaft assembly comprising
a keyed male rotary shaft, and
a slotted female rotary shaft.

8. The stuffed waffle cooking device of claim 7 further comprising a plurality of electric heating elements.

* * * * *